(12) United States Patent
Seo

(10) Patent No.: US 7,958,375 B2
(45) Date of Patent: Jun. 7, 2011

(54) RECORDING MEDIUM, APPARATUS FOR DECRYPTING DATA AND METHOD THEREOF

(75) Inventor: Kang Soo Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1041 days.

(21) Appl. No.: 11/331,210

(22) Filed: Jan. 13, 2006

(65) Prior Publication Data

US 2007/0067646 A1 Mar. 22, 2007

Related U.S. Application Data

(60) Provisional application No. 60/644,588, filed on Jan. 19, 2005.

(30) Foreign Application Priority Data

Nov. 16, 2005 (KR) ........................ 10-2005-0109694

(51) Int. Cl.
G06F 12/14 (2006.01)
(52) U.S. Cl. ........................................ 713/193; 380/201
(58) Field of Classification Search .................. 713/193, 713/194, 185, 165; 380/201, 201.277; 726/35, 726/19
See application file for complete search history.

(56) References Cited

U.S. PATENT DOCUMENTS

| 7,322,513 | B2 * | 1/2008 | Kuo et al. .................... 235/375 |
| 2002/0076204 | A1 * | 6/2002 | Nakano et al. ................ 386/94 |
| 2002/0112172 | A1 * | 8/2002 | Simmons ...................... 713/193 |
| 2002/0146122 | A1 * | 10/2002 | Vestergaard et al. ......... 380/231 |
| 2002/0159592 | A1 * | 10/2002 | Matsushima et al. ......... 380/201 |
| 2002/0186842 | A1 * | 12/2002 | Sabet-Sharghi et al. ...... 380/200 |
| 2003/0072453 | A1 | 4/2003 | Kelly et al. |
| 2003/0086568 | A1 * | 5/2003 | Kato et al. .................... 380/201 |
| 2003/0138100 | A1 * | 7/2003 | Ishizaka et al. ............... 380/201 |

(Continued)

FOREIGN PATENT DOCUMENTS

CN 1552073 12/2004

(Continued)

OTHER PUBLICATIONS

International Search Report issued Jul. 6, 2006 in corresponding International Patent Application No. PCT/KR2006/000031.

(Continued)

Primary Examiner — Matthew B Smithers
Assistant Examiner — Abu Sholeman
(74) Attorney, Agent, or Firm — Harness, Dickey & Pierce, P.L.C.

(57) ABSTRACT

A recording medium, apparatus for decrypting data and method thereof are disclosed. The present invention includes downloading encrypted data associated with a recording medium to a local storage, decrypting data recorded in the recording medium using a first type key within a key file stored in the recording medium and decrypting the downloaded data using a second type key within one of the key file stored in the recording medium or a key file stored in the local storage. And, the present invention includes downloading the data encrypted with a key associated with a recording medium to a local storage, reading out a decryption key using link information between the data and the key, and decrypting the data using the decryption key. Accordingly, by the present invention, unauthorized copy, redistribution and the like of contents can be prevented. Hence contents can be safely provided and data can be efficiently reproduced, whereby more convenient functions can be provided to a user.

28 Claims, 15 Drawing Sheets

U.S. PATENT DOCUMENTS

| | | | |
|---|---|---|---|
| 2003/0142827 A1* | 7/2003 | Ohwada et al. | 380/277 |
| 2004/0139338 A1* | 7/2004 | Ohmori et al. | 713/193 |
| 2005/0131998 A1* | 6/2005 | Takashima | 709/203 |
| 2006/0014521 A1* | 1/2006 | Chen et al. | 455/410 |
| 2006/0227973 A1* | 10/2006 | Takashima et al. | 380/277 |
| 2007/0073620 A1* | 3/2007 | Gandolph et al. | 705/50 |
| 2007/0217305 A1* | 9/2007 | Seo et al. | 369/47.1 |
| 2008/0232781 A1* | 9/2008 | Ohizumi et al. | 386/124 |

FOREIGN PATENT DOCUMENTS

| | | |
|---|---|---|
| EP | 1710950 | 10/2006 |
| JP | 2002-374244 | 12/2002 |
| JP | 2004-087063 | 3/2004 |
| JP | 2005-033781 | 2/2005 |
| RU | 2298235 | 4/2007 |
| WO | WO 96/11446 | 4/1996 |
| WO | WO/2004/030356 * | 4/2004 |
| WO | WO-2004-030356 * | 8/2004 |
| WO | 2004/114303 A1 | 12/2004 |
| WO | WO 2005/041185 | 5/2005 |
| WO | WO2005/052941 | 6/2005 |
| WO | WO 2005/074187 | 8/2005 |
| WO | WO2005/091367 | 9/2005 |

OTHER PUBLICATIONS

Office Action issued Jun. 5, 2009 by the Chinese Patent Office in counterpart Chinese Patent Application No. 200680002373.6 (with English language translation).

Russian Notice of Allowance for corresponding Application No. 2007131440 dated Jun. 2, 2010.

European Search Report dated Dec. 29, 2009 for corresponding Application No. 06700313.7.

Intel Corporation et al., "Advanced Access Control System (AACS) Technical Overview (informative)", Jul. 21, 2004.

Blu-Ray Disc Founders, "White paper Blu-Ray Disc Format 2.A logical and audio visual application format specifications for BD-RE", Aug. 2004.

Intel Corporation, "Content Protection for Recordable Media Specification-Network Download Book", XP002379489, Aug. 5, 2004.

Taylor J Ed, "DVD demystified, Passage", DVD Demstified (Second Edition) XP002319697, pp. 254-257, Jan. 1, 2001.

* cited by examiner

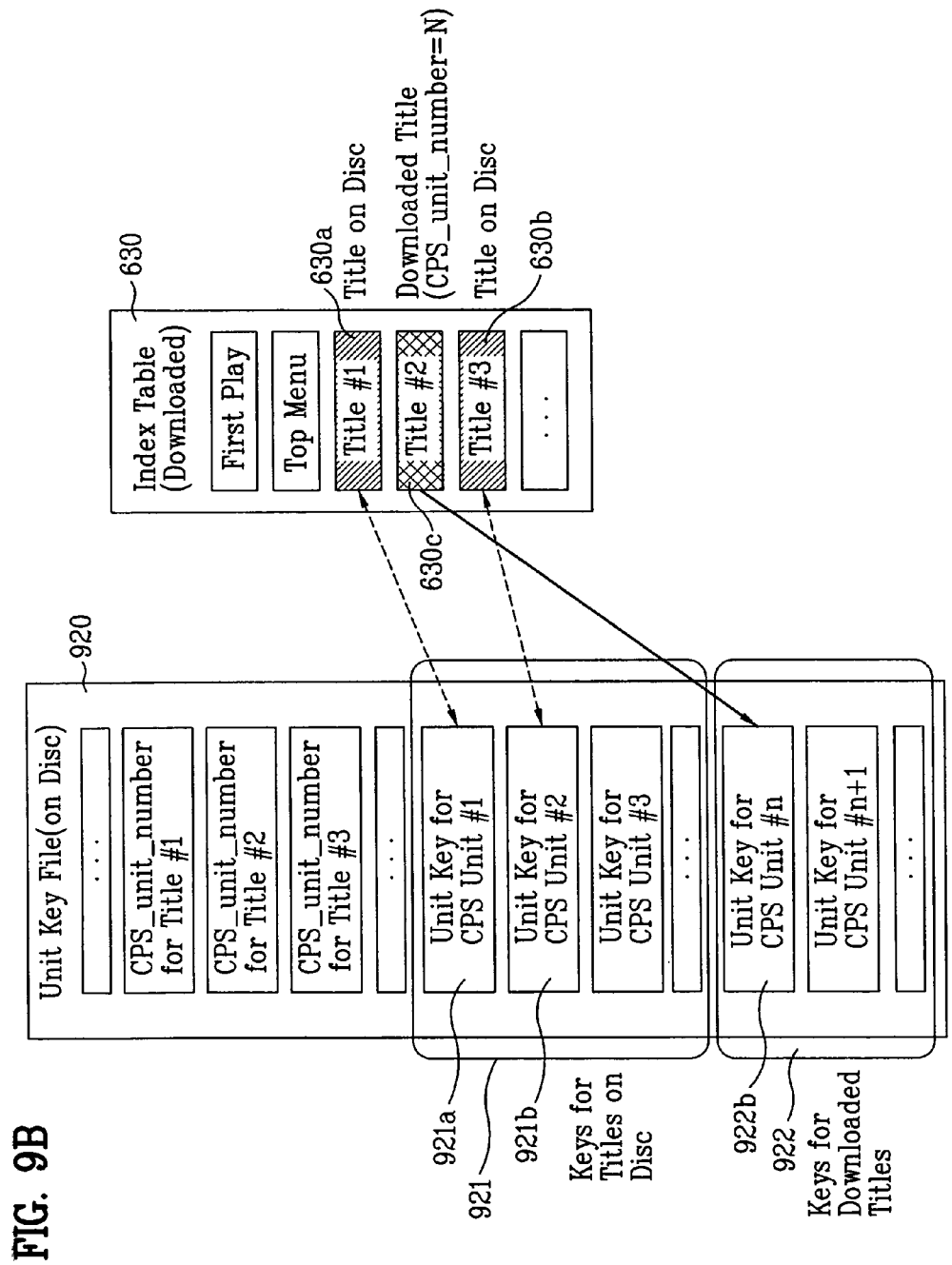

RECORDING MEDIUM, APPARATUS FOR DECRYPTING DATA AND METHOD THEREOF

This application claims the benefit of the Korean Patent Application No. 10-2005-0109694, filed on Nov. 16, 2005, which is hereby incorporated by reference as if fully set forth herein.

This application claims the benefit of the U.S. Provisional Application No. 60/644,588, filed on Jan. 19, 2005, in the name of inventor Kang Soo SEO entitled "CONTENT PROTECTION RULE FOR BLU-RAY DISC", which is hereby incorporated by reference as if fully set forth herein.

BACKGROUND OF THE INVENTION

1. Field of the Invention

The present invention relates to a playback of a recording medium, and more particularly, to a recording medium, apparatus for decrypting data and method thereof.

2. Discussion of the Related Art

Generally, optical discs capable of recording large-scale data as record media are widely used. Recently, a new high-density recording medium, e.g., Blu-ray disc (hereinafter abbreviated BD) has been developed to store video data of high image quality and audio data of high sound quality for long duration.

The BD as a next generation recording medium technology is a next generation optical record solution provided with data remarkably surpassing that of a conventional DVD. And, many efforts are made to research and develop the BD together with other digital devices.

An optical recording/reproducing device with the application of the Blu-ray Disc specifications starts to be developed. Yet, due to the incomplete Blu-ray disc specifications, the complete development of the optical recording/reproducing device has many difficulties.

Specifically, the optical recording/reproducing device should be provided with a basic function of recording and reproducing a Blu-ray disc (BD) and additional functions considering convergence with peripheral digital devices. Hence, it is expected that the optical recording/reproducing device should be provided with a general function of receiving to display an external input signal and a function of reproducing a BD together with the external input signal.

However, in reproducing the external input signal and the BD, since a preferable method of protecting shared data provided by a content provider has not been proposed or developed, many limitations are put on the development of a full-scale BD based optical recording/reproducing device.

SUMMARY OF THE INVENTION

Accordingly, the present invention is directed to a recording medium, method of decrypting data and method thereof that substantially obviate one or more problems due to limitations and disadvantages of the related art.

An object of the present invention is to provide a recording medium, apparatus for decrypting data and method thereof, in which a local storage capable of storing data associated with the recording medium from outside the recording medium is provided and by which contents can be protected using the local storage and the recording medium.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of decrypting data according to the present invention includes the steps of downloading encrypted data associated with a recording medium to a local storage, decrypting data recorded in the recording medium using a first type key within a key file stored in the recording medium, and decrypting the downloaded data using a second type key within one of the key file stored in the recording medium or a key file stored in the local storage.

For example, the second type key is identical to the first type key.

For example, the second type key is stored separate from the first type key.

For example, the key file stored in the local storage is stored separate from the key file stored in the recording medium.

For example, the key file stored in the local storage includes a downloaded key.

For example, the key file stored in the local storage is read from the recording medium to be stored in the local storage.

For example, the key file stored in the local storage is placed in a secure area established in the local storage.

For example, in case that the downloaded data is sub path data associated with a main path recorded within the recording medium, the sub path data is decrypted using a same key of the main path data.

In another aspect of the present invention, a method of decrypting data includes the steps of downloading the data encrypted with a key associated with a recording medium to a local storage, reading out a decryption key using link information between the data and the decryption key, and decrypting the data using the decryption key.

For example, the link information is included in a database file of the downloaded data.

For example, the link information is stored as a link information file in the local storage.

For example, the link information file is stored within a secure area in the local storage.

For example, the link information file is stored within an AV data record area in the local storage.

For example, the link information is 'CPS_unit_number'.

For example, the decryption key is defined with reference to the 'CPS_unit_number' each.

For example, the 'CPS_unit_number' is assigned per title.

In another aspect of the present invention, a recording medium includes a stream area in which contents are recorded and a database area for managing a reproduction of the contents, wherein a plurality of titles encrypted with a key are included in the stream area and wherein in case that a plurality of the titles share a clip entirely or in part with each other, the titles sharing the clip are encrypted with a same key.

For example, in case that the title encrypted with a key includes a main path and a sub path, each of the main path and the sub path is encrypted with a same key.

For example, in case that a downloaded title shares a clip configuring encrypted titles within the recording medium entirely or in part, the titles sharing the clip within the recording medium are encrypted with a same key.

In another aspect of the present invention, an apparatus for decrypting data includes a pickup reading data recorded in a recording medium, a local storage storing downloaded encrypted data associated with the recording medium, and a controller decrypting the data recorded in the recording medium using a first type key within a key file stored in the recording medium, the controller decrypting the downloaded data using a second type key within one of the key file stored in the recording medium or a key file stored in the local storage.

For example, the second type key is identical to the first type key.

For example, the second type key is stored separate from the first type key.

For example, the key file stored in the local storage is stored separate from the key file stored in the recording medium.

For example, the key file stored in the local storage is placed in a secure area established in the local storage.

For example, in case that the downloaded data is sub path data associated with a main path recorded within the recording medium, the controller decrypts the sub path data using a same key of the main path data.

In another aspect of the present invention, an apparatus for decrypting data includes a pickup reading data recorded in a recording medium, a local storage storing downloaded encrypted data associated with the recording medium, and a controller reading out a decryption key using link information between the downloaded data and the decryption key, the controller decrypting the downloaded data using the decryption key.

For example, the link information is included a database file of the downloaded data.

For example, the link information is stored as a link information file in the local storage.

For example, the link information file is stored within a secure area in the local storage.

For example, the link information file is stored within a AV data record area in the local storage.

For example, the link information is CPS_unit_number.

By the present invention, contents can be safely provided and the data can be efficiently reproduced. Hence, the present invention can provide more convenient functions to a user.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9B is a diagram for explaining a method of decrypting data using link information according to a sixth embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, for convenience of explanation, the present invention takes an optical disc, and more particularly, "Blu-ray disc (BD)" as an example of a recording medium. Yet, it is apparent that the technical idea of the present invention is identically applicable to other record media.

Figure 1:
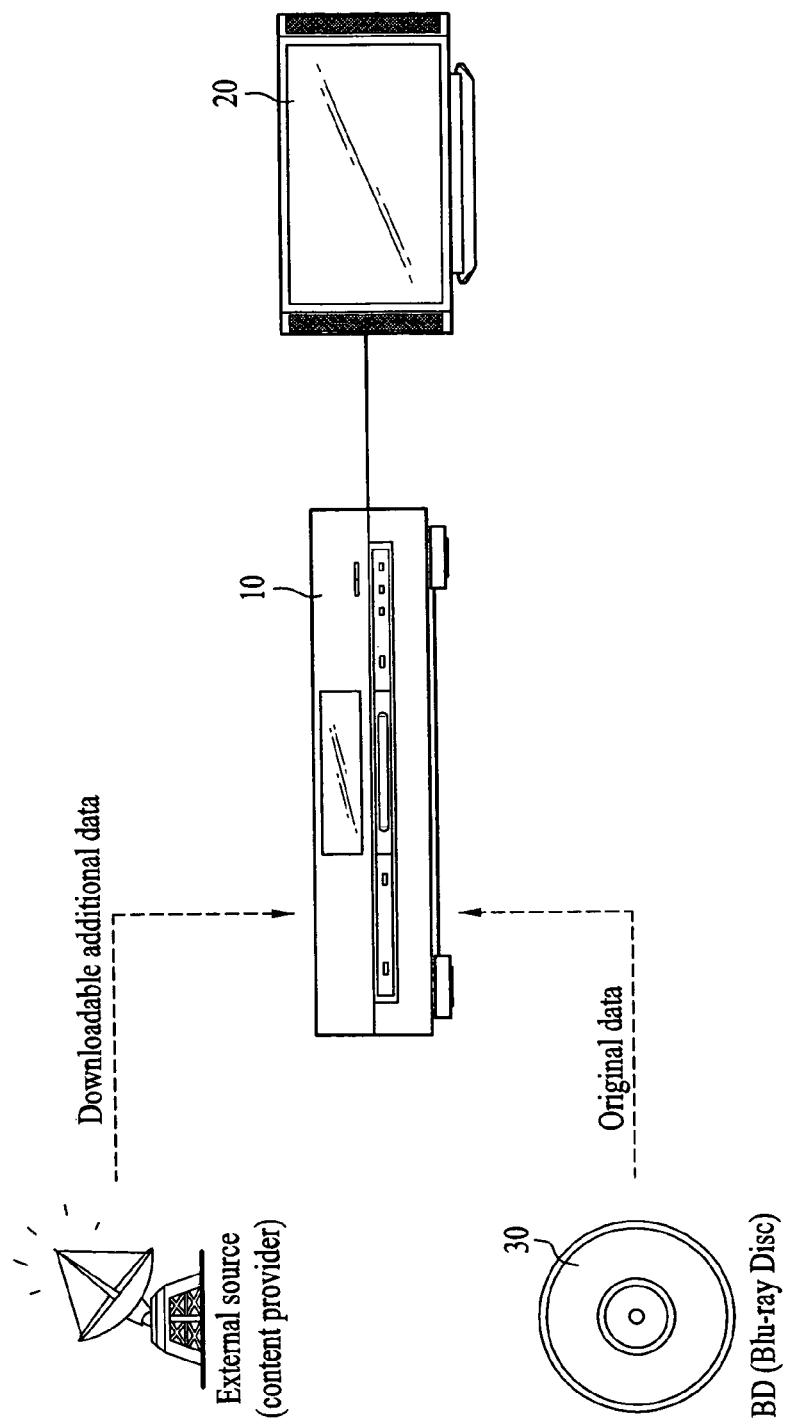
FIG. 1 is a diagram for facilitating a conceptional understanding of the present invention.

In the present invention, "local storage" is a sort of a storage means provided within an optical recording/reproducing device shown in FIG. 1 and means an element in which a user can randomly store necessary information and data to utilize. In particular, the local storage, which is currently used in general, includes "hard disc", "system memory", "flash memory" or the like, which does not put limitation on the scope of the present invention.

Specifically, the "local storage" is utilized as a means for storing data associated with a recording medium (e.g., Blu-ray disc). The data associated with the recording medium to be stored within the local storage generally includes data downloaded from outside.

Besides, it is apparent that a permitted data directly read out of a recording medium in part or a generated system data (e.g., metadata, etc.) associated with record/reproduction of the recording medium can be stored within the local storage.

For convenience of explanation of the present invention, the data recorded within the recording medium shall be named "original data" and the data associated with the recording medium among the data stored within the local storage shall be named "additional data".

In the present invention, "title" is a reproduction unit configuring an interface with a user. Each title is linked to a specific object. And, a stream associated with the corresponding title recorded within a disc is reproduced according to a command or program within the object. In particular, for explanation convenience of the present invention, a title having moving picture, movie and interactive information according to MPEG2 compression among titles recorded within a disc shall be named "HDMV Title". And, a title having moving picture, movie and interactive information executed by a Java program among titles recorded within a disc shall be named "BD-J Title".

FIG. 1 is a diagram for facilitating a conceptional understanding of the present invention, in which a unified use between an optical recording/reproducing device 10 and peripheral devices is exemplarily shown.

Referring to FIG. 1, "optical recording/reproducing device" 10 according to the present invention enables a record or playback of an optical disc according to versatile specifications. And, the optical recording/reproducing device 10 can be designed to record/reproduce an optical disc (e.g., BD) of a specific specification. Moreover, the optical recording/reproducing device 10 can be made to play an optical disc only. In the following description of the present invention, by considering interactivity between a Blu-ray disc (BD) and a peripheral device, a BD-player or a BD-recorder will be taken as an example. And, it is apparent that the "optical recording/reproducing device" 10 includes "drive" loadable within a computer or the like.

The optical recording/reproducing device 10 according to the present invention is equipped with a function of recording/playing an optical disc 30 and a function of receiving an external input signal, performing signal-processing on the received signal, and delivering a corresponding image to a user via another external display 20. In this case, no limitation is put on the external input signal. And, a DMB (digital multimedia broadcast) signal, an Internet signal or the like can be a representative one of the external input signals. In case of Internet as an easily accessible medium, a specific data on Internet can be downloaded via the optical recording/reproducing device 10 to be utilized.

Besides, a party, who provides contents, as an external source is generically named "content provider (CP)".

In the present invention, contents, which configure a title, mean data provided by a recording medium author.

Specifically, the object of the present invention is to decrypt encrypted data using a key in case that additional data which is associated with original data is encrypted. Encryption and decryption using the key will be explained with reference to FIG. 5 later.

The original data and the additional data will be explained in detail as follows. For instance, if a multiplexed AV stream for a specific title is recorded as an original data within an optical disc and if an audio stream (e.g., English) different from the audio stream (e.g., Korean) of the original data is provided as an additional data on Internet, a request for downloading the audio stream (e.g., English) as the additional data on Internet to reproduce with the AV stream of the original data or a request for downloading the audio stream (e.g., English) as the additional data on Internet to reproduce only will exist according to a user. To enable the requests, association between the original data and the additional data needs to be regulated and a systematic method of managing/reproducing the data according to the user's request is needed.

For convenience of explanation in the above description, a signal recorded within a disc is named original data and a signal existing outside the disc is named additional data, which is identified according to a method of acquiring each data but does not put limitation on restricting the original or additional data to a specific data.

Hence, the additional data generally includes audio, presentation graphic (PG), interactive graphic (IG), text subtitle or the like, on which limitation is not put. And, the additional data can correspond to a multiplexed AV stream including all of the illustrated data and video. Namely, data having any kind of attribute, which exists outside the optical disc and is associated with the original data, can become the additional data.

Moreover, the additional data can be individually downloaded per index file (index), PlayList file (*.m2ts) or clip information file (*.clpi). Besides, the additional data can be downloaded by contents unit or by title unit.

To realize the user's requests, it is essential to provide a file structure between the original data and the additional data. File and data record structures usable for a Blu-ray disc (BD) are explained in detail with reference to FIG. 2 and FIG. 3 as follows.

Figure 2:
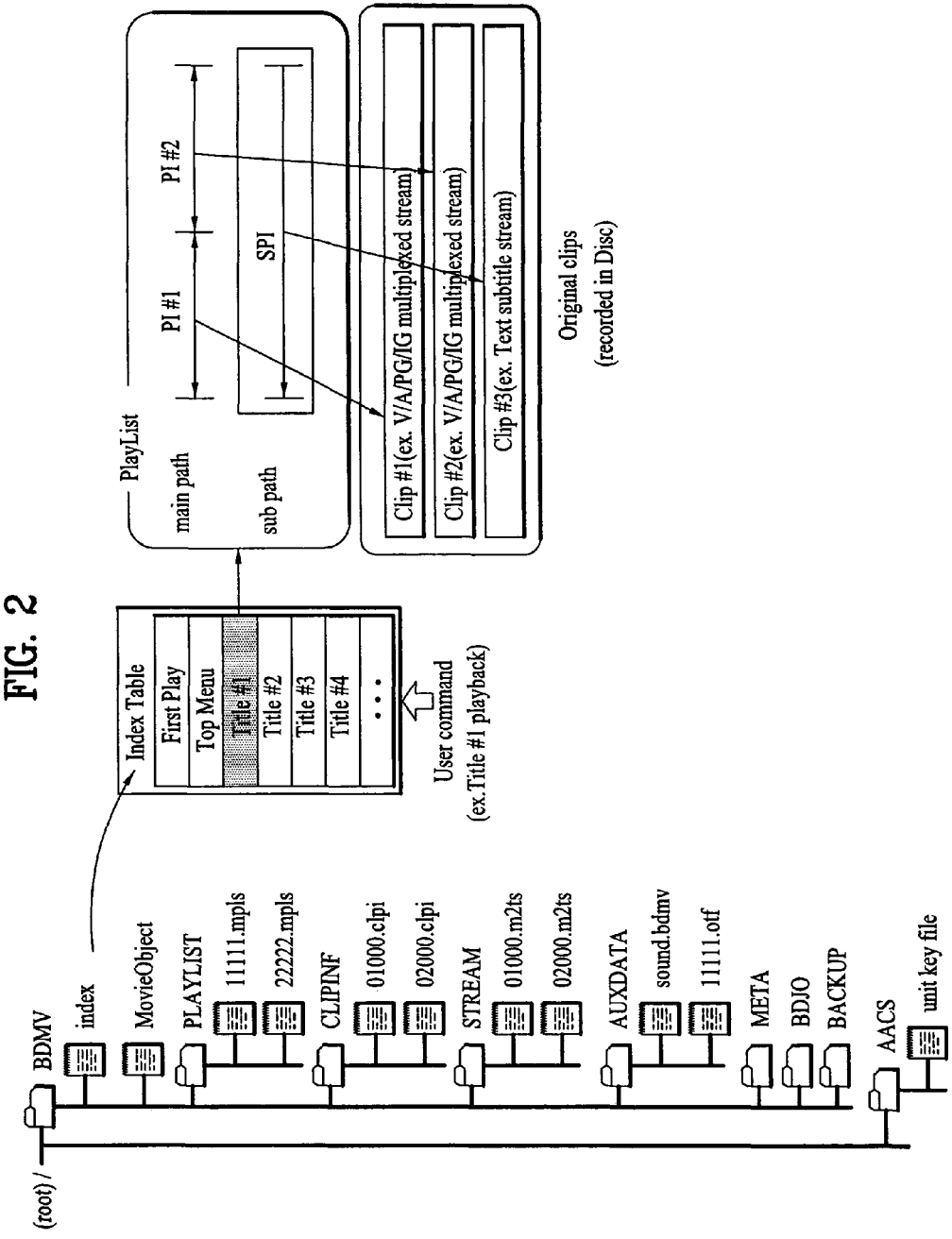
FIG. 2 is a diagram of a file structure recorded within an optical disc as a recording medium according to the present invention and a relation in reproducing a specific title using the file structure.

FIG. 2 is a diagram of a file structure recorded within an optical disc as a recording medium according to the present invention and a relation in reproducing a specific title using the file structure.

Referring to FIG. 2, in a file structure according to the present invention, an AACS directory and at least one BDMV directory exist below one root directory. An index file ("index") and an object file ("MovieObject") as general file (higher file) information to secure interactivity with a user exist within the BDMV directory. And, the BDMV directory, which has information of data actually recorded within a disc and information about a method of reproducing the recorded data, is provided with PLAYLIST directory, CLIPINF directory, STREAM directory, AUXDATA directory, BDJO directory, META directory and BACKUP directory. The directories and files included in each of the directories are explained in detail as follows.

META directory includes a metadata file as data about a data. Namely, in the META directory, a search file, a metadata file for Disc Library and the like exits.

BDJO directory includes a BD-J Object file for reproducing a BD-J Title.

AUXDATA directory includes auxiliary files containing information required for a disc playback. For instance, AUXDATA directory can include a sound file ("Sound.bdmv") providing click sound in case of an execution of interactive graphic and a font file ("1111.otf") providing font information in case of a disc playback.

In STREAM directory, AV stream files recorded within a disc in a specific format exist, each of the streams is recorded as MPEG-2 transport packets in general, and ".m2ts" is used as an extension of a stream file (01000.m2ts, In particular, a stream generated from multiplexing video, video and graphic information together is named an A/V stream and at least one or more A/V stream files construct a title.

CLIPINF directory includes clip information files (01000.clpi, 02000.clpi) according to one-to-one correspondence to the stream files, respectively. In particular, the clip information file ("*.clpi") includes attribute information and timing information of the corresponding stream file. In particular, the stream file ("*.m2ts") and the clip information file ("*.clpi") corresponding to the stream file (*.m2ts) by one-to-one are bound together to be named "clip". Namely, "clip" is the data containing both of the stream file ("*.m2ts") and the clip information file ("*.clpi").

PLAYLIST directory includes PlayList files ("*00000.mpls"). Each of the PlayList files ("*00000.mpls") includes at least one PlayItem and SubPlayItem (SPI) designating a playing interval of reproducing a specific clip. The PlayItem and SubPlayItem (SPI) have information about a reproduction start time (IN-Time) and reproduction end time (OUT-Time) of a specific clip.

A reproduction process within PlayList file by at least one PlayItem (PI) is called "main path" and a reproduction process within PlayList file by at least one SubPlayItem (SPI) is called "sub path". The main path should exist within the PlayList file and at least one sub path may exist according to a presence of SubPlayItem (SPI) if necessary.

Namely, the PlayList file becomes a basic reproduction management file unit within an entire reproduction management file structure, which performs a reproduction of a specific clip by a combination of at least one or more PlayItems.

BACKUP directory stores all copy files of index file ("index") recording information associated with a disc playback among data of the file structure, object files (MovieObject, BD-J Object), all PlayList files ("*.mpls") within PLAYLIS directory, and all clip information files ("*.clpi") within CLIPINF directory. Since the loss of the files is fatal to the disc playback, the BACKUP directory stores these files for backup.

In the AACS directory, a unit key file exists. And, encryption information for the data encrypted with a key exists in the unit key file.

Another diagram of FIG. 2 shows a relation that a specific title is reproduced by the aforesaid disc package.

If a user's title reproducing command for a title provided by an index file, which is called an index table as well, is given, a reproduction of the corresponding title will begin, which is explained in detail as follows.

First of all, "First play" information having information about a firstly reproduced image in case of a loading of a corresponding disc, "Top Menu" information providing a menu image, and at least one "Title (Title #1-Title #n)" information are configured within the index table (index.bdmv).

Once an optical disc 30 is loaded in an optical recording/reproducing device 10, the title menu information by the index table is provided to a user via a display 20. If the user selects a specific title or a specific menu within the menu image, a reproduction starts according to a file structure previously defined by a disc author. Namely, if a reproduction command for a specific title (e.g., Title #1) is given, a corresponding PlayList file is executed according to a command or program provided within an object file (Movie Object, BD-J Object) on a reproduction management file structure. At least one or more clips (e.g., Clip #1-Clip # 3) configuring the Title #1 are then reproduced by a specific PlayItem and/or Sub-PlayItem according to PlayList file information.

In case that "First play", "Top Menu" or "Title" is encrypted, data, which will reproduced by "First play", "Top Menu" or "Title", needs to be decrypted for the reproduction. If a reproduction command for one of "First play", "Top Menu" and "Title" is given, a key corresponding to a unit key file within AACS directory is read out. And, data is decrypted using the read-out key. The decrypted data is then reproduced.

Figure 3:
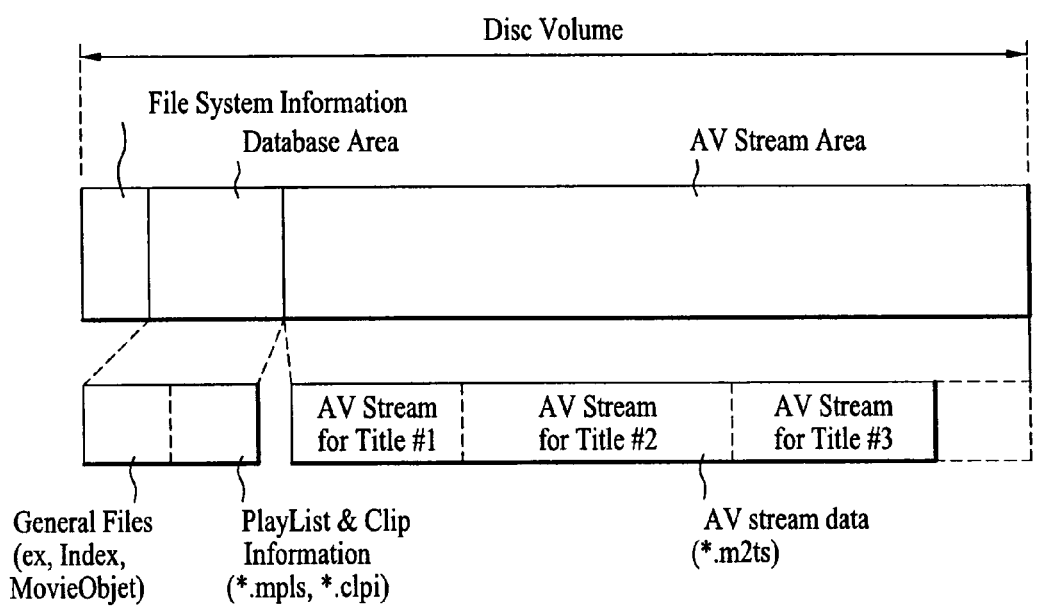
FIG. 3 is a diagram of a data record structure written on an optical disc as a recording medium according to the present invention.

FIG. 3 is a diagram of a data record structure written on an optical disc as a recording medium according to the present invention.

Referring to FIG. 3, in view from an inner circumference of a disc, there exist a file system information area as system information for managing an entire file, an area ("database area") in which PlayList and clip information files are written to reproduce a recorded AV stream (*.m2ts), and an AV stream area in which a stream configured with audio/video/graphic and the like is recorded. As mentioned in the foregoing description, in the present invention, the data recorded in the AV stream area is named original data.

In case that original data recorded within the disc (e.g., file structure shown in FIG. 2) and additional data stored within a local storage are encrypted, the present invention intends to provide an apparatus and method for decrypting the encrypted data.

FIG. 4A is a block diagram of an optical recording/reproducing device 10 according to one embodiment of the present invention.

Referring to FIG. 4A, an optical recording/reproducing device 10 according to one embodiment of the present invention basically includes a pickup 11 for reproducing management information including original data and reproduction management file information recorded in an optical disc, a servo 14 controlling an action of the pickup 11, a signal processor 13 restoring a reproduction signal received from the pickup 11 to a specific signal value, the signal processor 13 modulating a signal to be recorded into a signal recordable on the optical disc, the signal processor 13 delivering the modulated signal, and a microprocessor 16 controlling the overall operations.

Additional data existing other than on the optical disc is downloaded to a controller 12 by a user command or the like. And, the controller 12 enables the downloaded data to be stored in a local storage 15. In case that the original data and/or additional data are encrypted, the controller 12 decrypts the encrypted data and then reproduces the decrypted data according to a user's request.

And, an A/V decoder 17 finally decodes output data (original data and/or additional data) according to a control of the controller 12 and then provides to the decoded data to a user.

Moreover, in order to perform a function of recording a signal on the optical disc, an AV encoder 18 converts an input signal to a signal of a specific format, e.g., an MPEG2 transport stream according to a control of the controller 12 and then provides the converted signal to the signal processor 13.

Figure 5:
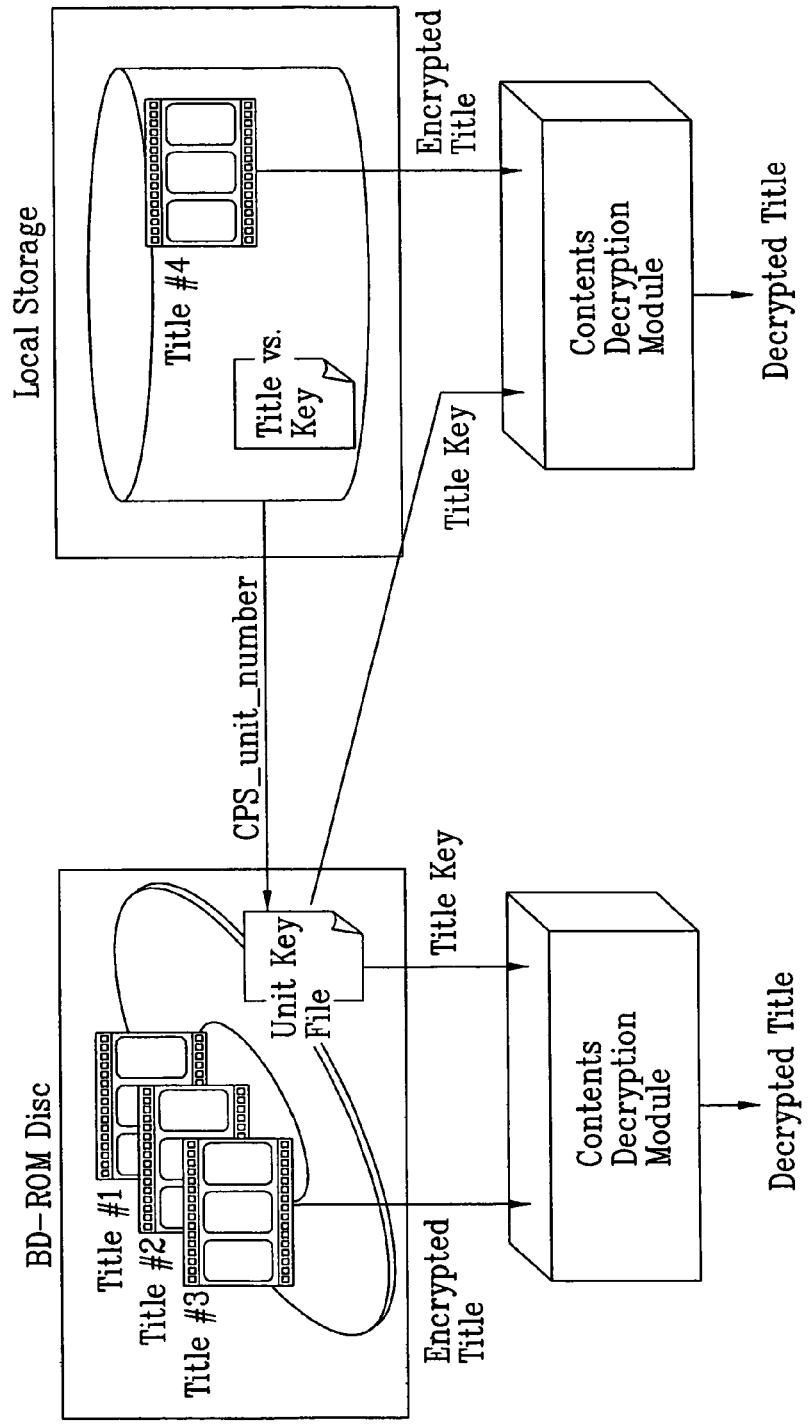
FIG. 5 is a diagram for facilitating a conceptional understanding of encryption/decryption of data according to the present invention.

FIG. 5 is a diagram for facilitating a conceptional understanding of encryption/decryption of data according to the present invention.

Referring to FIG. 5, first of all, encryption of data is explained as follows. Encryption is a sort of a content protecting method of preventing illegal copy redistribution, editing and the like of contents provided by a content provider (CP) in a manner of transforming data using a specific algorithm. Hence, the encryption of data plays a role as a sort of a lock that prevents an unauthorized access to the data and the specific algorithm plays a role as a key for the lock. Hereinafter, the specific algorithm used for the encryption of data is called an encryption key.

A means for interpreting the specific algorithm used for the encryption should be provided to reproduce the encrypted data. The specific algorithm interpreting means plays a role as a sort of a key for the lock. If the key is provided, the algorithm used for the data decryption is interpreted using the key and the data is recovered to its original format. Such a data recovery is called a decryption.

In the present invention, the algorithm used for the encryption and decryption of data is named a key. The encryption of data can be executed per such a predetermined unit as a contents unit, a title unit and the like. And, a key used in encrypting data per the predetermined unit shall be named "Unit Key".

In the present invention, "CPS (content protection system) unit" means a group of "First play", "Top Menu" and/or "title" that are encrypted using the same "Unit Key". And, each "CPS Unit" has "CPS_unit_number".

For instance, all AV stream files reproduced by "First Play" use the same "Unit Key" to be included in the same "CPS Unit". All AV stream files reproduced by "Top Menu" are encrypted using the same "Unit Key" to be included in the same "CPS Unit". And, all AV stream files reproduced by one Title are encrypted using the same "Unit Key" to correspond to the same "CPS Unit".

In particular, in FIG. 5, Title #1, Title #2 and Title #3 are recorded in a BD-ROM disc as a recording medium. And, Title #4 downloaded from outside of the recording medium exists in a local storage. Data configuring the titles (Titles #1 to #4) are encrypted data, and information about a key used for encryption of the data exists as a unit key file within the disc. The unit key file can exist outside the disc. Yet, the unit key file preferably exists within the disc to prevent information leakage caused by hacking and the like.

In case that a user selects Title # 3 recorded within the disc to reproduce, a key used in decrypting the Title #3 (hereinafter called a decryption key) should be provided to Contents Decryption Module to reproduce the Title #3.

Once the decryption key of Title #3 is provided, the contents decryption module decrypts the Title # 3 into the data form before the encryption using the provided key. So, the decrypted data is reproduced via a decoder 17.

A title including the downloaded data within a local storage in FIG. 5 is represented as Title #4 and is then provided to a user. If a user gives a command for a reproduction of Title #4, a decryption key of the Title #4 is read out of the unit key file. The read-out decryption key is provided to the contents decryption module together with Title #4 to decrypt the Title #4.

FIGS. 6 to 8B show methods of decrypting data using a key according to embodiments of the present invention, respectively.

Figure 6:
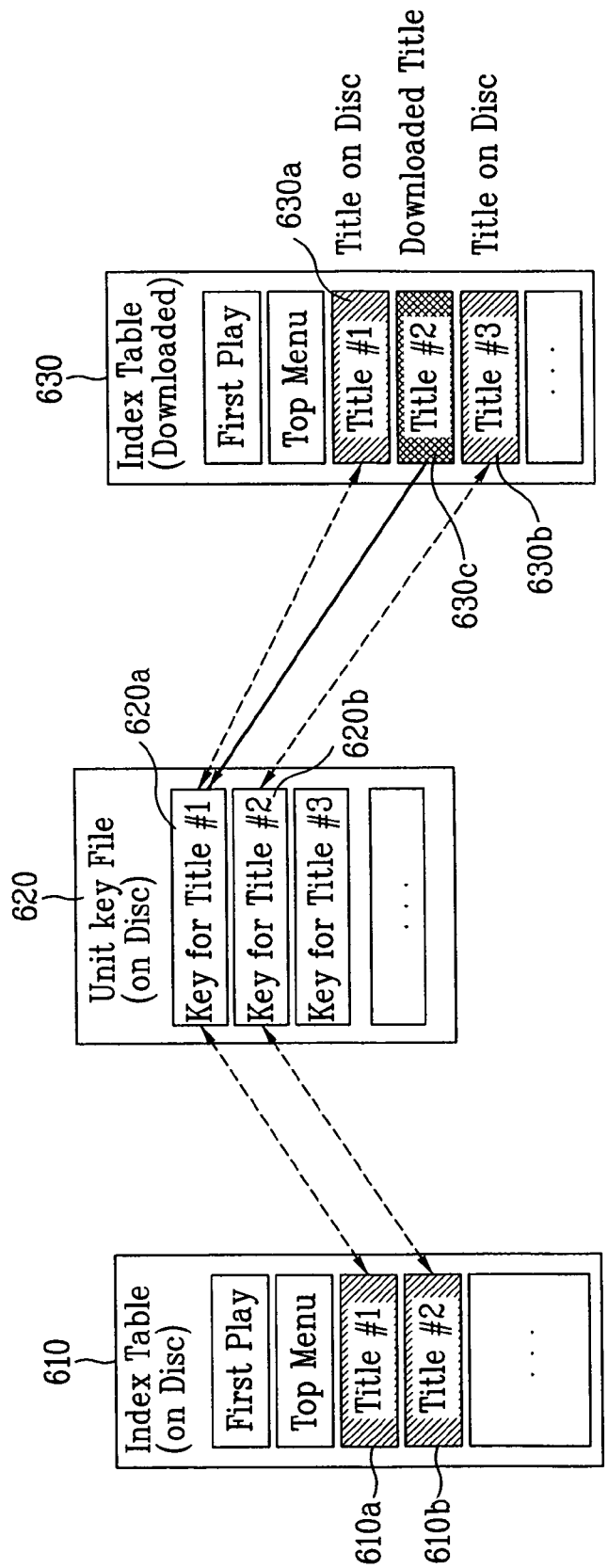
FIG. 6 is a diagram for explaining a method of decrypting data according to a first embodiment of the present invention.
Figure 7:
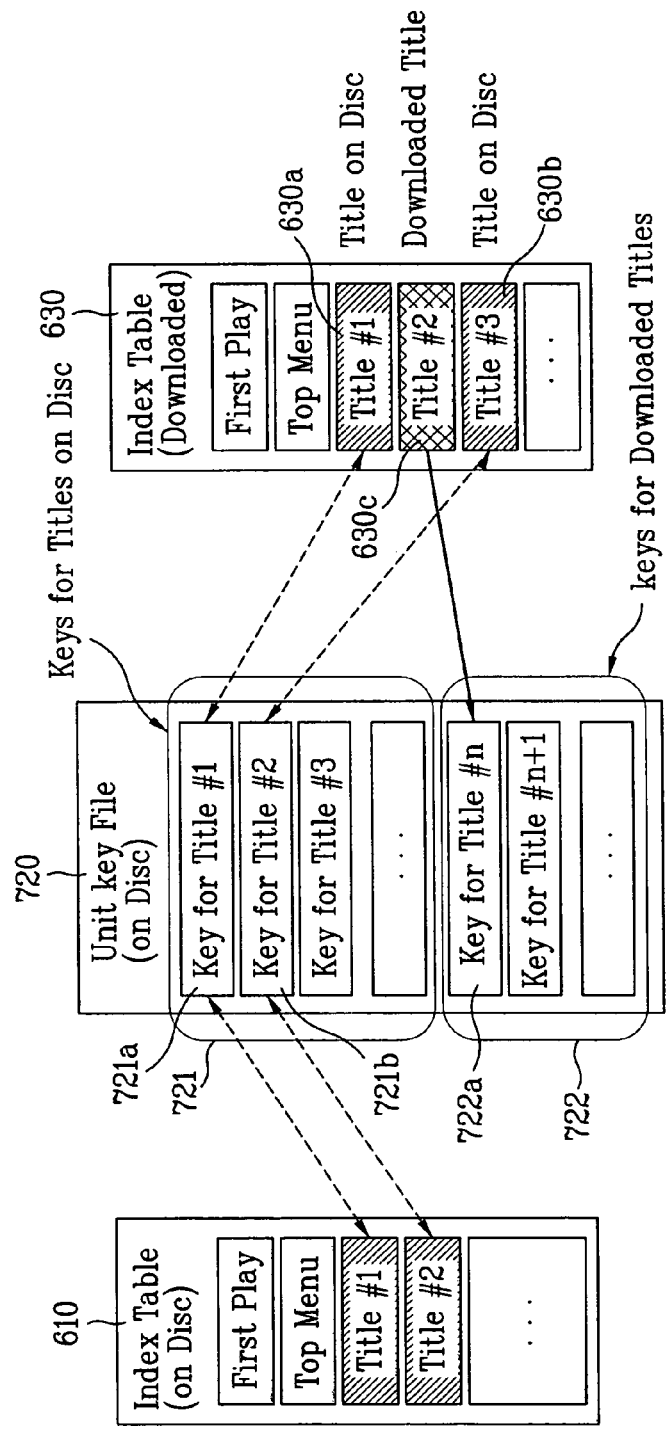
FIG. 7 is a diagram for explaining a method of decrypting data according to a second embodiment of the present invention.
Figure 8A:
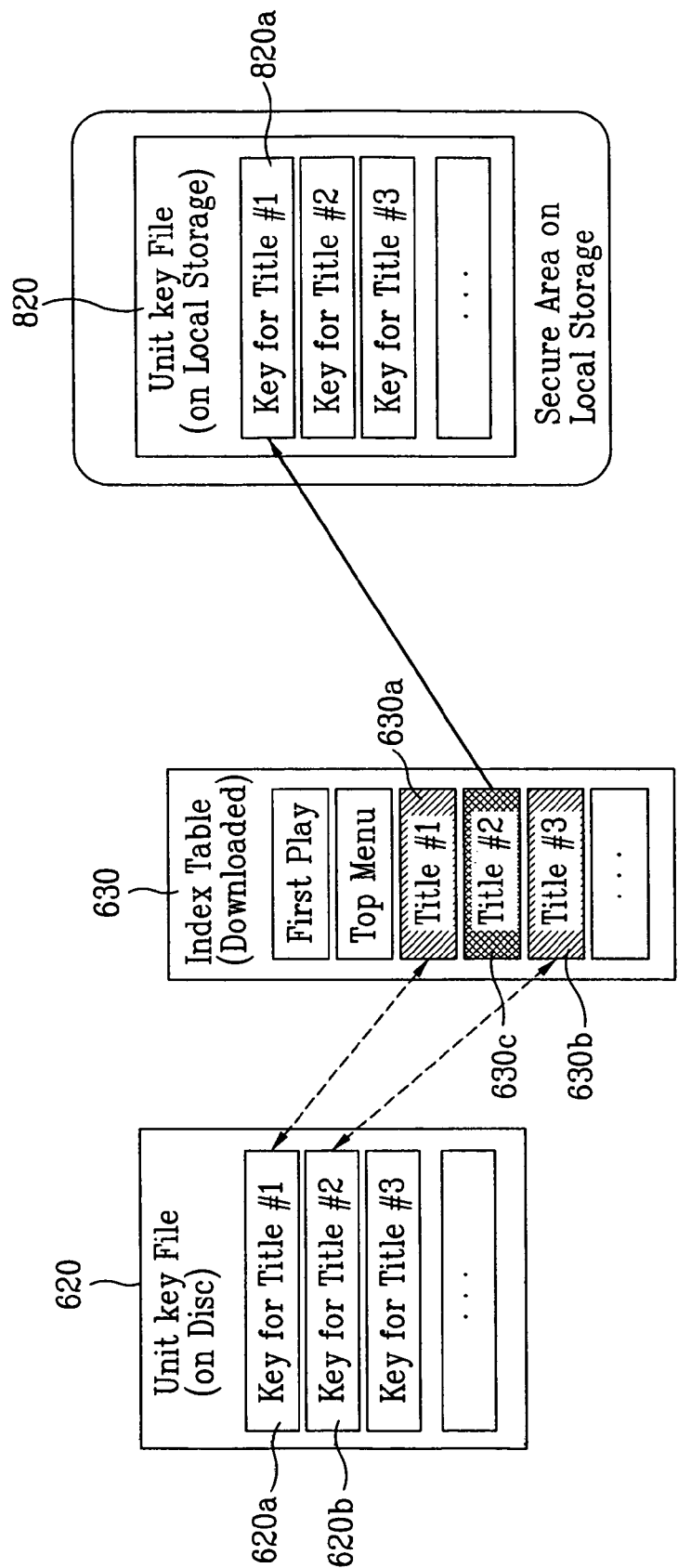
FIG. 8A is a diagram for explaining a method of decrypting data according to a third embodiment of the present invention.
Figure 8B:
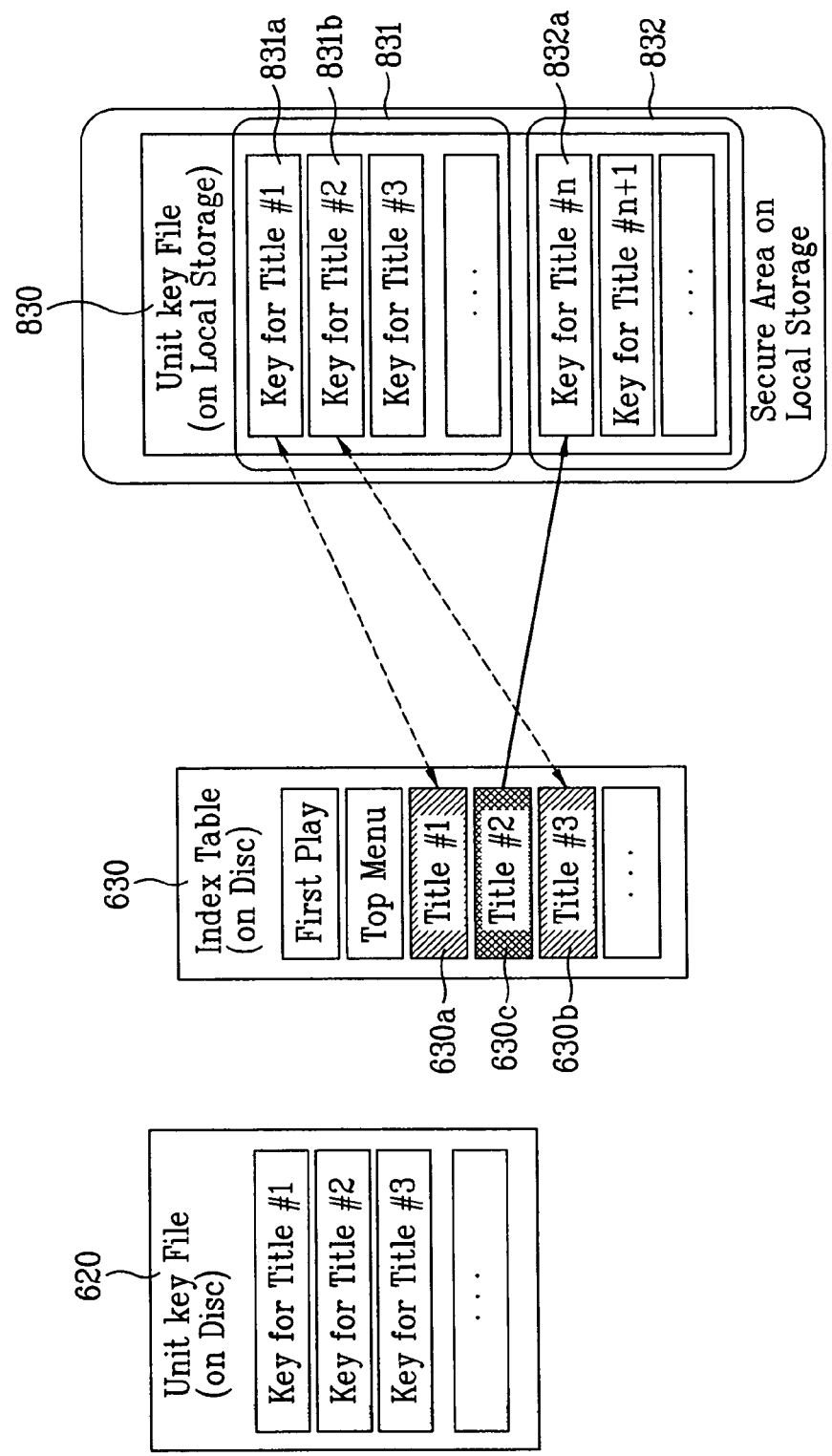
FIG. 8B is a diagram for explaining a method of decrypting data according to a fourth embodiment of the present invention.

FIG. 6. or FIG. 7 shows a method of decrypting downloaded data using a key existing within a disc. In FIG. 6, a decryption key of downloaded data is a key used for decryption of a data recorded within a disc. In FIG. 7, a decryption key of downloaded data is separately stored within a disc for the downloaded data. FIG. 8A or FIG. 8B shows a method of decrypting a data using a key within a unit key file stored in a local storage. In FIG. 8A, downloaded data only uses a key within a unit key file placed in a local storage. In FIG. 8B, a data recorded in a disc uses a key read from unit key file placed in a local storage.

FIG. 6 is a diagram for explaining a method of decrypting data according to a first embodiment of the present invention, in which downloaded data is decrypted using a key stored within a disc to be used for a decryption of a data recorded within a disc. Namely, downloaded data share decryption key with data recorded in a disc.

Referring to FIG. 6, an index table 610 and a unit key file 620 exist in a disc. The index table 610 existing within the disc is configured with "First Play", "Top Menu" and "Titles (Title #1, Title #2, . . . )".

In the unit key file within the disc, information about a decryption key of data configuring indexing items (i.e., "First Play", "Top Menu" and "Titles (Title #1, Title #2, . . . )") included in the index table is stored. Hereinafter, a decryption key of a data configuring Title #n is represented as "Key for Title #n". Namely, "Key for Title #1" 620a is a key provided for Title #1 610a within a disc and "Key for Title #2" 620b is a key provided for Title #2 610b within a disc.

An encrypted data can be downloaded to a local storage from outside of a disc. A new index table 630 capable of reproducing the downloaded data is provided to a user. Title #1 630a in the index table 630 corresponds to Title #1 (Title on disc) 610a within the disc, Title #2 630c corresponds to a Title (hereinafter called downloaded Title) including the downloaded data, and Title #3 630b corresponds to Title #2 (Title on disc) 610b within the disc.

In case that the downloaded Title #2 630c is configured with the encrypted data, the encrypted data should be decrypted to reproduce the Title #2.

FIG. 6 shows a case that a decryption key for the downloaded data exists within the disc, in which the key corresponds to a decryption key for another data existing within the disc as well. Namely, Title #2 630c in the new index table can be decrypted with "Key for Title #1" 620a. In this case, the "Key for Title #1" 620a is a decryption key for Title #1 (610a=630a) recorded within the disc.

A content provider can encrypt a data, which shall be decrypted using a decryption key 620a, 620b or the like for data recorded within the disc, and then provides the encrypted data to a user. In case that the user receives the encrypted data through downloading, a player reads a decryption key for the downloaded data from the disc, decrypts the downloaded data with the read-out decryption key, and then reproduces the decrypted data.

FIG. 7 is a diagram for explaining a method of decrypting data according to a second embodiment of the present invention, in which downloaded data is decrypted using a key separately stored within a disc for the downloaded data. Namely, decryption keys for data recorded in a disc are not used for decryption of downloaded data Referring to FIG. 7, an index table recorded within a disc and a new table for reproducing downloaded data are equivalent to the index tables 610 and 630 shown in FIG. 6, respectively. Yet, in the embodiment shown in FIG. 7, keys 722, which differ from decryption keys 721 recorded within a disc for data recorded within the disc, for downloaded data are separately stored within the disc. In case that an encrypted data is downloaded, the encrypted data is decrypted within one of the separately stored keys 722.

Namely, Titles (630a=610a, 630b=610b) recorded within the disc are decrypted using the decryption keys 721 recorded within the disc, respectively. And, a downloaded Title 630c is decrypted using one of the keys 722 separately stored for the downloaded data.

In particular, once a reproduction command of Title #1 630a of a new index table 630 is given, "Key for Title #1" 721a among the decryption keys 721 for the Titles recorded within the disc is provided to a Contents decryption module with the Title #1. In the contents decryption module, Title #1 is decrypted by the "Key for Title #1" 721a. And, "Key for Title #2" 721b as a decryption key for Title #3 630b is one of the decryption keys 721 of the Titles recorded within the disc as well.

A disc author can store spare keys in the disc to consider downloaded data. And, the disc author can encrypt a data with a corresponding key to enable the encrypted data to be decrypted with one of the keys and then provide the encrypted data to a user. Namely, Title #2 630c in the new index table 630 is encrypted to be decrypted with one (Key for Title #n) 722a of the stored spare keys 722 for the downloaded data and the encrypted data is then provided to a user. Once the user gives a reproduction command for the Title #2 630c, a player reads out "Key for Title #n" among the keys 722 stored for the downloaded data and then decrypts Title #2 using the read-out key.

FIG. 8A is a diagram for explaining a method of decrypting data according to a third embodiment of the present invention, in which a key separate from that stored in a disc is stored in a local storage and in which downloaded data is decrypted using the key stored in the local storage. Namely, there exist two unit key files associated with a disc in the disc and a local storage, respectively.

A decryption key preferably exists within a disc to prevent information leakage caused by hacking and the like. Yet, a secure area that an unauthorized user cannot access may be established in a local storage so that a key can be stored within the secure area.

In the present embodiment, a unit key file 820 is stored within a local storage as well as another unit key file 620 is stored in a disc. Name, a unit key file exists within each of the disc and the storage. The unit key file stored in the local storage may be downloaded from an outside of the disc or can be read from the disc.

Besides, in decrypting data, a data stored within a disc can be decrypted using a key stored within a disc and downloaded data can be decrypted using a key stored within a local storage.

Once a reproduction command for Title #1 or Title #2 in a new index table 630 is given, a player reads out a key corresponding to each Title among the keys 620 stored within the disc and then provides the read-out key to a contents decryption module. In particular, "Key for Title #1" 620a is read out for Title #1 among the keys 620 stored within the disc and "Key for Title #2" 620b is read out for Title #3.

On the other hand, once a production command for Title #2 is given, a corresponding key 820a is read out from a unit key file 820 stored within the local storage in the process of decrypting the Title #2 instead of a unit key file 620 in the disc.

FIG. 8B is a diagram for explaining a method of decrypting data according to a fourth embodiment of the present invention, in which a unit key file exists in a local storage and in which a data recorded within a disc and downloaded data are decrypted using the key within the unit key file in the local storage.

Like FIG. 8A, FIG. 8B shows a unit key file is stored in a local storage besides a key file in a disc. In FIG. 8A, the key stored in the local storage is used for the decryption of the downloaded data only. Yet, in FIG. 8B, the key stored in the local storage is used for a decryption of downloaded data and a decryption of a data recorded within a disc.

Namely, decryption keys of Title #1, Title #2 and Title #3 are read out not from a unit key file 620 in a disc but from a unit key file 830 in a local storage. A decryption of Title #2 630c as a downloaded Title is performed using "Key for Title #n" 832a within the local storage. And, decryptions of Title #1 630a and Title #3 630b as Titles recorded within the disc are performed using "Key for Title #1" 831a and "Key for Title #2" 831b within the local storage, respectively.

The unit key file 830 stored in the local storage may include downloaded keys or can be read from the disc to be stored in the local storage. Optionally, as mentioned in the foregoing description of FIG. 8A, a secure area is established within the local storage and the corresponding keys can be stored in the secure area.

Alternatively, in case of decrypting a data recorded within a disc using a key separately stored in a local storage instead of using a key stored within a disc, the key used for a decryption of the data recorded within the disc can be permitted only if being read from the keys stored within the disc. For instance, one unit key file is configured with key(s) recorded within a disc and downloaded key(s) and then stored in a local storage. Once a reproduction of a data is given, necessary keys can be read from the unit key file stored in the local storage.

Meanwhile, FIG. 8B shows an example that keys 832 for downloaded Titles 630c are stored in local storage separate from keys 831 for Titles 630a and 630b. As the key used for the data stored within the disc is usable for the downloaded data in FIG. 6, it is apparent that keys can be stored without identifying whether to be provided for Titles recorded within a disc or for downloaded Titles.

In the present invention, by enabling a user possessing a key corresponding to a data encryption only to decrypt a corresponding data, content provider's contents can be safely provided. Namely, in case that an unauthorized user receives downloaded data, it would be apparent that the unauthorized user fails in possessing a corresponding key. So, the unauthorized user is unable to reproduce the corresponding data. Hence, a recording medium and contents downloaded to a local storage can be protected.

Besides, in case that a data is encrypted and if there exist a plurality of keys enabling a decryption of the data, a key suitable for a decryption of the encrypted data needs to be selected. So, the present invention provides a method and apparatus for decrypting data using link information to enable a selection of a key suitable for a decryption of an encrypted data.

Figure 9A:
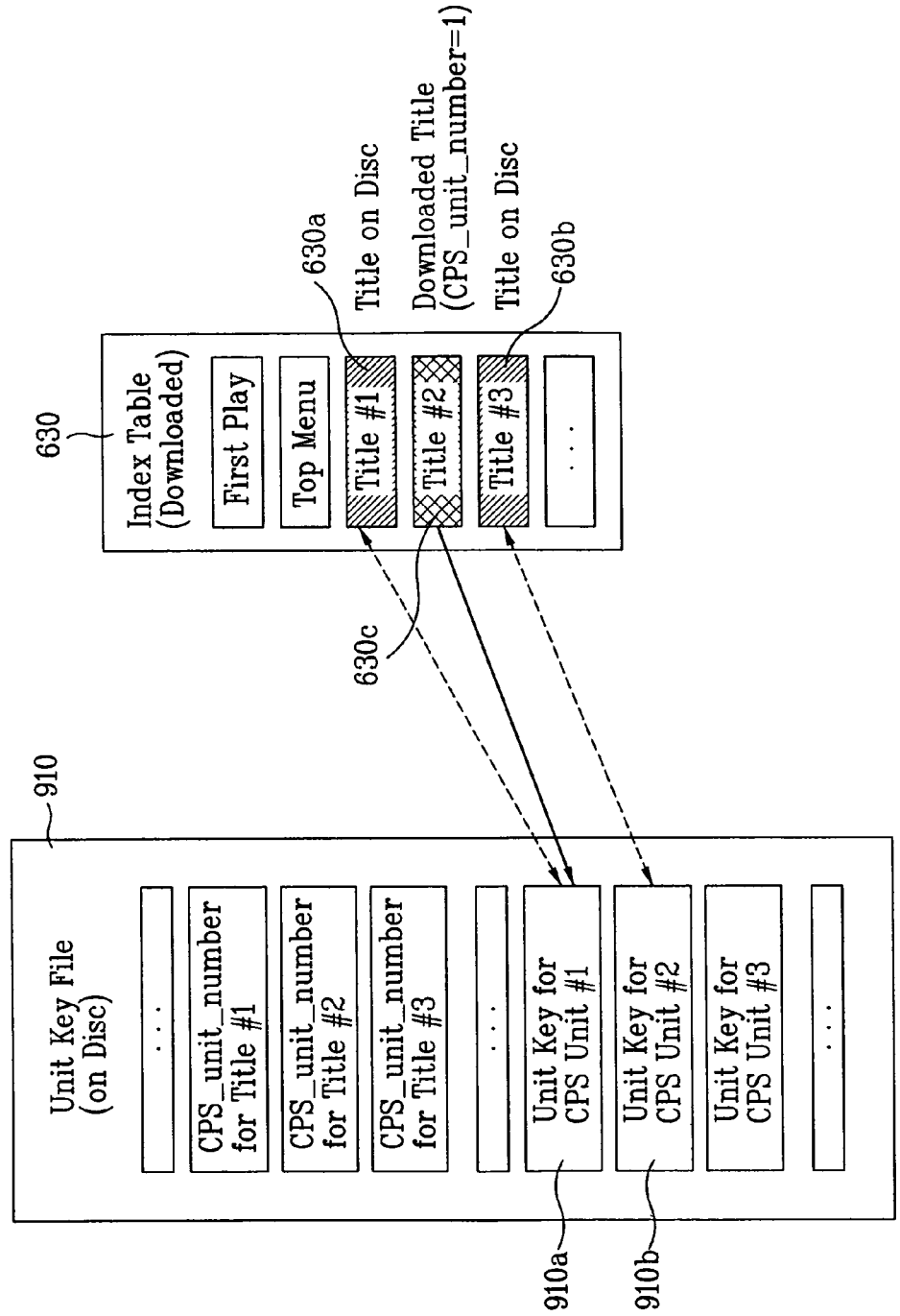
FIG. 9A is a diagram for explaining a method of decrypting data using link information according to a fifth embodiment of the present invention.
Figure 9C:
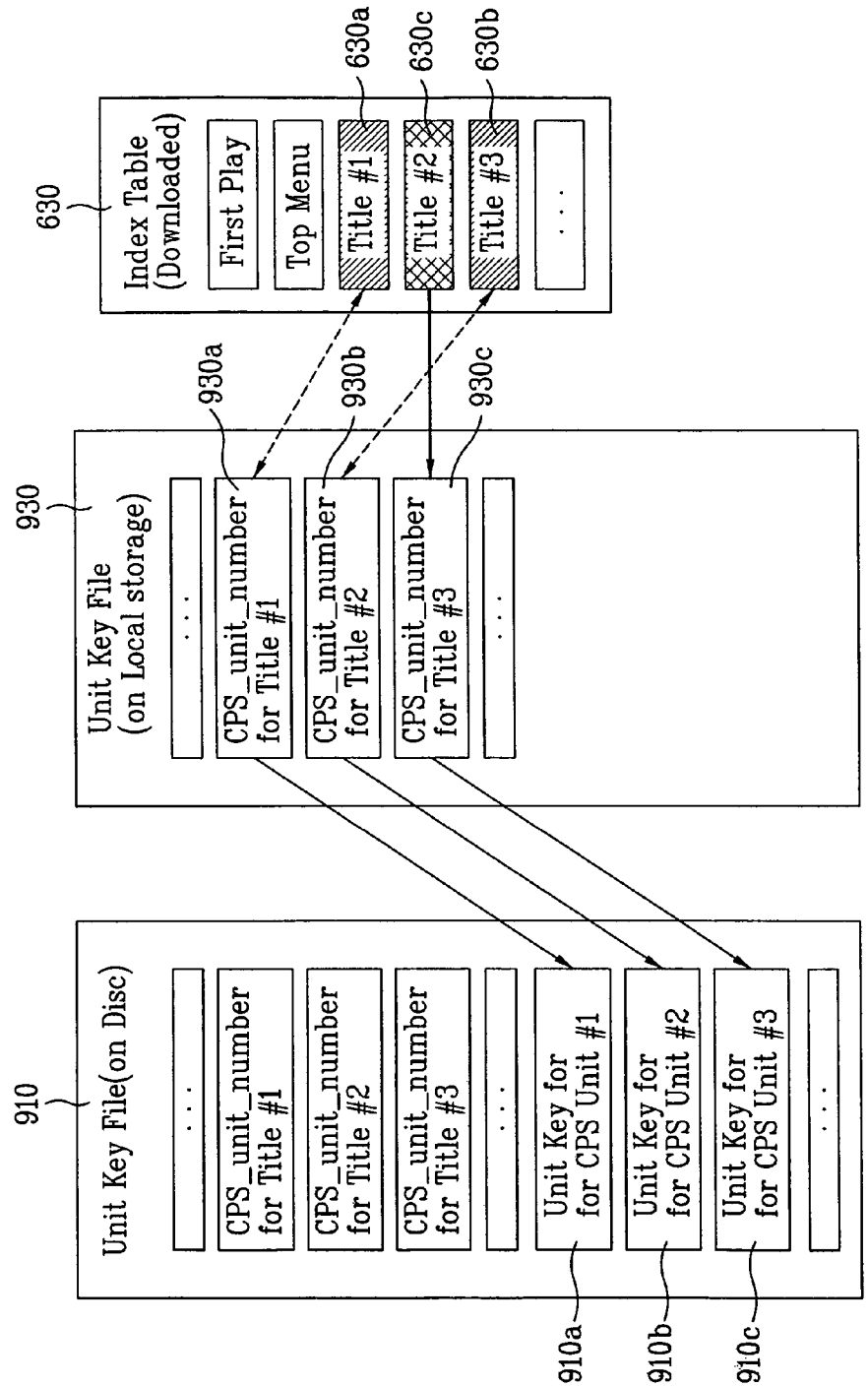
FIG. 9C is a diagram for explaining a method of decrypting data using link information according to a seventh embodiment of the present invention.

FIGS. 9A to 9C show methods of decrypting data using link information according to embodiments of the present invention, respectively.

In the following description, data configuring one title are encrypted using a same "Unit Key" and "CPS_unit_number" is used as link information, for example. As mentioned in the foregoing description, "CPS_unit_number" is given by unit of "CPS Unit" and the "CPS Unit" means a group of data encrypted a same "Unit Key".

FIG. 9A and FIG. 9B show cases that link information of downloaded data is stored in a database file such as an index table and the like. And, FIG. 9C shows a case that link information of downloaded data and link information of data recorded within a disc are provided as a separate file to a local storage.

A database file is a management file associated with a reproduction of data. And, the database file includes an index file, a PlayList file, a clip information file or the like. In the following description, link information is provided to the index table among the database files for example. Yet, it is apparent that the present invention is not limited to the following embodiment.

FIG. 9A is a diagram for explaining a method of decrypting data using link information according to a fifth embodiment of the present invention, in which link information indicating a key enabling a decryption of downloaded data exists and in which the key is used for an decryption of a data recorded within a disc. Namely, in FIG. 9A, decryption keys, e.g., 910a and 910b of data recorded within a disc are recorded in a unit key file 910 and a decryption key for a downloaded Title is not separately recorded.

The unit key file 910 includes information indicating that data recorded within the disc is included in which "CPS Unit" and "Unit Key" for the "CPS Unit". In the following description, the information indicating that encrypted data is included in which CPS Unit is represented as CPS_unit_number. In the embodiment shown in FIG. 9A, data configuring one Title are encrypted with a same "Unit Key" and "CPS_unit_number" can be granted to each Title.

Besides, the "CPS_unit_number" is individually given to each Title. And, it is unnecessary to assign a different "CPS_unit_number" to each Title. In other words, a plurality of Titles can have a same "CPS_unit_number" each or each Title can have a different "CPS_unit_number".

And, "Unit Key" recorded within a unit key file is preferably defined for each "CPS Unit". So, in the present invention, if "CPS_unit_number" differs from another, it means that a data is encrypted with a different "Unit Key" to be included in a different "CPS Unit". If "CPS_unit_number" is equal to another, data are encrypted with a same "Unit Key" to be included in a same "CPS Unit".

Title #1 630a of an index table 630 corresponds to Title #1 among Titles recorded within a disc and Title #3 630b corresponds to Title #2 among Titles recorded within the disc. Namely, if Title #3 630b is reproduced, Title #2 recorded within a disc is reproduced. Title #2 630c of the index table is a downloaded Title. The index table is newly constructed to enable a reproduction of a downloaded Title. The index table may be separately provided by a content provider or can be newly constructed by a player. The index table may be separately provided by a content provider or can be newly constructed by a player.

Hence, "CPS_unit_number for Title #1" becomes link information of Title #1 630a of the index table 630 and "CPS_unit_number for Title #2" becomes link information of Title #3 630b of the index table 630.

Once a reproduction command for Title #1 630a of the index table 630 is given, a player can see "CPS Unit" including the Title #1 630a therein by confirming "CPS_unit_number for Title #1" from a unit key file 910 stored within a disc. In FIG. 9A, the Title #1 is included in "CPS Unit #1". If it is confirmed that the Title #1 is included in the "CPS Unit #1", "Unit Key for CPS Unit #1" 910a is read out to decrypt the Title #1. In case of Title #3 630b of the index table, the Title #3 is the same Title of Title #2 recorded within the disc. Hence, it can be confirmed that the Title #3 630b is included in "CPS Unit #2" from "CPS_unit_number for Title #2".

Since a key enabling the Title #2 to be decrypted is needed to reproduce Title #2 630c of the index table 630 as well, a suitable key should be selected from a unit key file. The present invention is characterized in providing link information for linking a data to a key required for the decryption of the data to read out a key suitable for the decryption of the data that is downloaded. In this case, the link information can be provided to a database file.

For instance, if the Title #2 630c is included in "CPS Unit #1", e.g., if a decryption key of the Title #2 630c is "Unit Key for CPS Unit #1", link information of "CPS_unit_number=1" for the Title #2 can be placed in an index table including the Title #2. In this case, once a reproduction command for the Title #2 630c is given, a player confirms "CPS_unit_number" from the index table and then reads out "Unit Key for CPS Unit #1" 910a.

The decryption key of the Title #2 630c is also a decryption key of Title #1 630a that is a Title recorded within a disc. The Title #2 630c and Title #1 630a are encrypted with a same key to share "Unit Key".

By leaving the link information between the encrypted data and the key used for the decryption of the data, the key used for the decryption of the data can be easily read out using the link information. Hence, the present invention can decrypt data smoothly.

FIG. 9B is a diagram for explaining a method of decrypting data using link information according to a sixth embodiment of the present invention, in which link information about downloaded data exists in an index table and in which a key read out by the link information is separately stored within a disc for the downloaded data.

Referring to FIG. 9B, link information between downloaded data and a decryption key of the data exists within a database file like FIG. 9A. Yet, FIG. 9B differs from FIG. 9A in that the downloaded data is decrypted using a key different from that of a data recorded within a disc.

As mentioned in the foregoing description of FIG. 9A, an index table is a new index table 630 to reproduce downloaded Titles. Title #1 630a and Title #3 630b among Titles of the new index table are equal to Title #1 and Title #2 recorded within a disc, respectively. And, Title #2 630c is a downloaded Title.

Hence, once a reproduction command for a Title recorded within a disc is given, a key capable of decryption the Title can be read out using "CPS_unit_number" per Title of a unit key file 920. Namely, Title #1 630a of the index table 630 can confirm information indicating that the Title #1 630a is included in "CPS Unit #1" via "CPS_unit_number for Title 1". Once the information is confirmed, the Title #1 630a can be decrypted by reading "Unit key for CPS Unit #1" 921a from decryption keys 921 of data recorded within the disc. Likewise, Title #3 630b of the index table 630 is decrypted by "Unit Key for CPS Unit #2" 921a among decryptions keys 921 of data recorded within the disc via "CPS_unit_number for Title #2".

Apart from a decryption key for a data recorded within a disc, a disc author can store a spare key for downloaded data in a disc to consider the downloaded data. A content provider provides a data by encrypting the data to be decrypted by a key separately stored for downloaded data among the keys stored within the disc. Hence, a user possessing the key only can reproduce the downloaded data.

Title #2 630b is encrypted to be decrypted by "Unit Key for CPS Unit #n" 922a among keys 922 additionally stored within a disc for downloaded data. Link information for a decryption key of the Title #2 630c is represented as "CPS_unit_number=N" according to the present invention and exists in the index table 630 that is a database file. Once a reproduction command for Title #2 630c is given, a player confirms that "CPS_unit_number" is "N" in the index table 630 and then reads out "Unit Key for CPS Unit #n". The read-out "Unit Key for CPS Unit #n" and Title #3 630 are provided to a contents decryption module together so that the Title #e decrypted.

FIG. 9C is a diagram for explaining a method of decrypting data using link information according to a seventh embodiment of the present invention, in which link information is configured as a separate file within a local storage.

Like FIG. 9A or FIG. 9B, FIG. 9C shows an embodiment that a corresponding key can be read out by providing link information. Yet, FIG. 9C differs from FIG. 9A or FIG. 9B in that link information exists not in a database file but in a separate file and that a corresponding key for a Title recorded within a disc or a downloaded Title is read out using the file.

Referring to FIG. 9C, a unit key file 910 for encrypted data exists within a disc and a new index table 630 enabling downloaded data to be reproduced exists.

Title #1 630a is a Title encrypted with "Unit Key for CPS Unit #1" 910a. Title #3 630b is a Title encrypted with "Unit Key for CPS Unit #2" 910b. And, Title #2 is a downloaded Title and is encrypted with "Unit Key for CPS Unit #3" 910b.

In order to reproduce a data by one of "First Play", "Top Menu" and "Title" of the index table 630, the data needs to be decrypted. For the decryption of the data, a proper key required for the decryption should be read out to be provided to a contents decryption module. Link information between an encrypted data and a decryption key of the data can be configured as a separate file within a local storage. And, the separately configured file is named a link information file in the following description.

A link information file 930 including "CPS_unit_number" for each item in the index table 630 is provided within a local storage. Title #1 630a of the index table 630 corresponds to Title #1 in the link information file, Title #2 630c corresponds to Title #3, and Title #3 630b corresponds to Title #2. In particular, "CPS_unit_number for Title #1" 930a indicates "CPS_unit_number" of Title #1 630a. "CPS_unit_number for Title #2" 930b indicates "CPS_unit_number" of Title #3 630b in the index table. And, "CPS_unit number for Title #3" 930c indicates "CPS_unit_number" of Title #2 630c.

Once a reproduction command for Title #1 630a is given, "CPS Unit" of the Title #1 630a can be seen from the link information file configured within the local storage. In FIG. 9C, "CPS_unit_number" of Title #1 630a of the index table is "1", "CPS_unit_number" of Title #2 630c of the index table is "3", and "CPS_unit_number" of Title #3 630b of the index table is "2". Hence, Title #1 630a is included in "CPS Unit #1". So, "Unit Key for CPS Unit #1" 910a is read from a unit key file 910. In case of Title #3 630b in the index table, "Unit Key for CPS Unit #2" 910b is read out. Title #2 630c has "CPS_unit_number" of "3" and is a data included in "CPS Unit #3". Hence, "Unit Key for CPS Unit #3" 910c is read out.

Meanwhile, by establishing a secure area within the local storage, the link information file 930 can be stored within the secure area. Alternatively, the link information file 930 can be stored within an AV data record area in which AV data are stored. The link information file 930 may be a sort of a unit key file configured with "CPS_unit_number" only. Yet, the link information file 930 does not include an actual key for decryption of data unlike the unit key file 910 stored within the disc.

Alternatively, the link information file 930 can be separately provided by a content provider to reproduce downloaded data or can be configured by reading out link information of downloaded data and data recorded within a disc.

And, a data recorded within a disc and downloaded data can share to use "Unit Key" in a unit key file. Yet, as mentioned in the foregoing description, spare "Unit Key" is stored for the downloaded data and the downloaded data can be decrypted using the spare "Unit Key".

Moreover, although the unit key file is stored within the disc in FIGS. 9A to 9C for example, the unit key file, as described in FIG. 8A and FIG. 8B, can be separately stored within the local storage.

The new index table 630 in FIGS. 6 to 9C may be downloaded from outside in a format of an index file ("index") or can be newly configured within the local storage. And, the new index table 630 just needs to be provided to a user to enable downloaded data to be decrypted.

Figure 10:
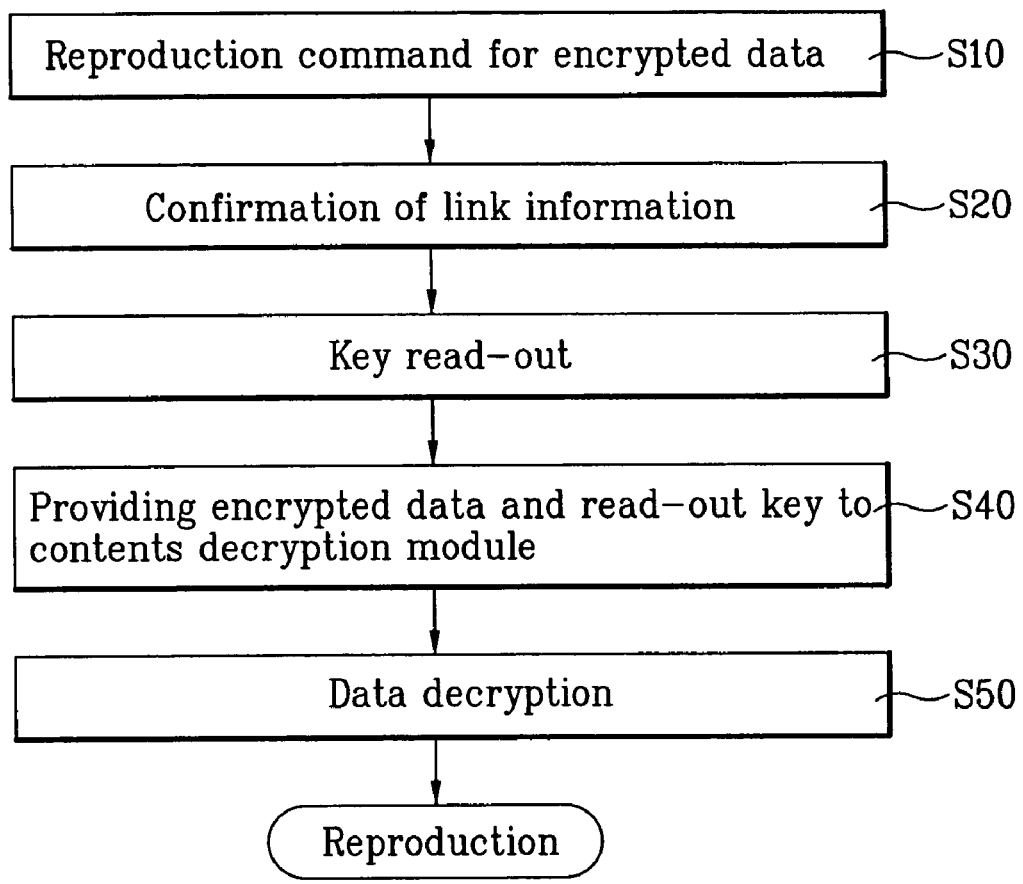
FIG. 10 is a flowchart of a method of decrypting data according to the present invention.

FIG. 10 is a flowchart of a method of decrypting data according to the present invention.

Referring to FIG. 10, once a reproduction command for an encrypted data is given (S10), a player checks link information of the data (S20). In this case, the link information may exist in a database or can exist as a link information file in a local storage, which is explained in the descriptions of FIGS. 9A to 9C.

A key used for an decryption of the data is read from a unit key file existing within a recording medium or local storage using the link information (S30). The unit key file may include decryptions key of data recorded within the recording medium only or can further include spare keys for downloaded data.

Once the key is read out (S30), the encrypted data is provided to a contents decryption module together with the key (S40). In the content decryption module, the data is decrypted using the provided key (S50). Once the data is decrypted, the data is recovered into a form prior to the encryption and is then reproducible by a decoder 17.

Figure 11:
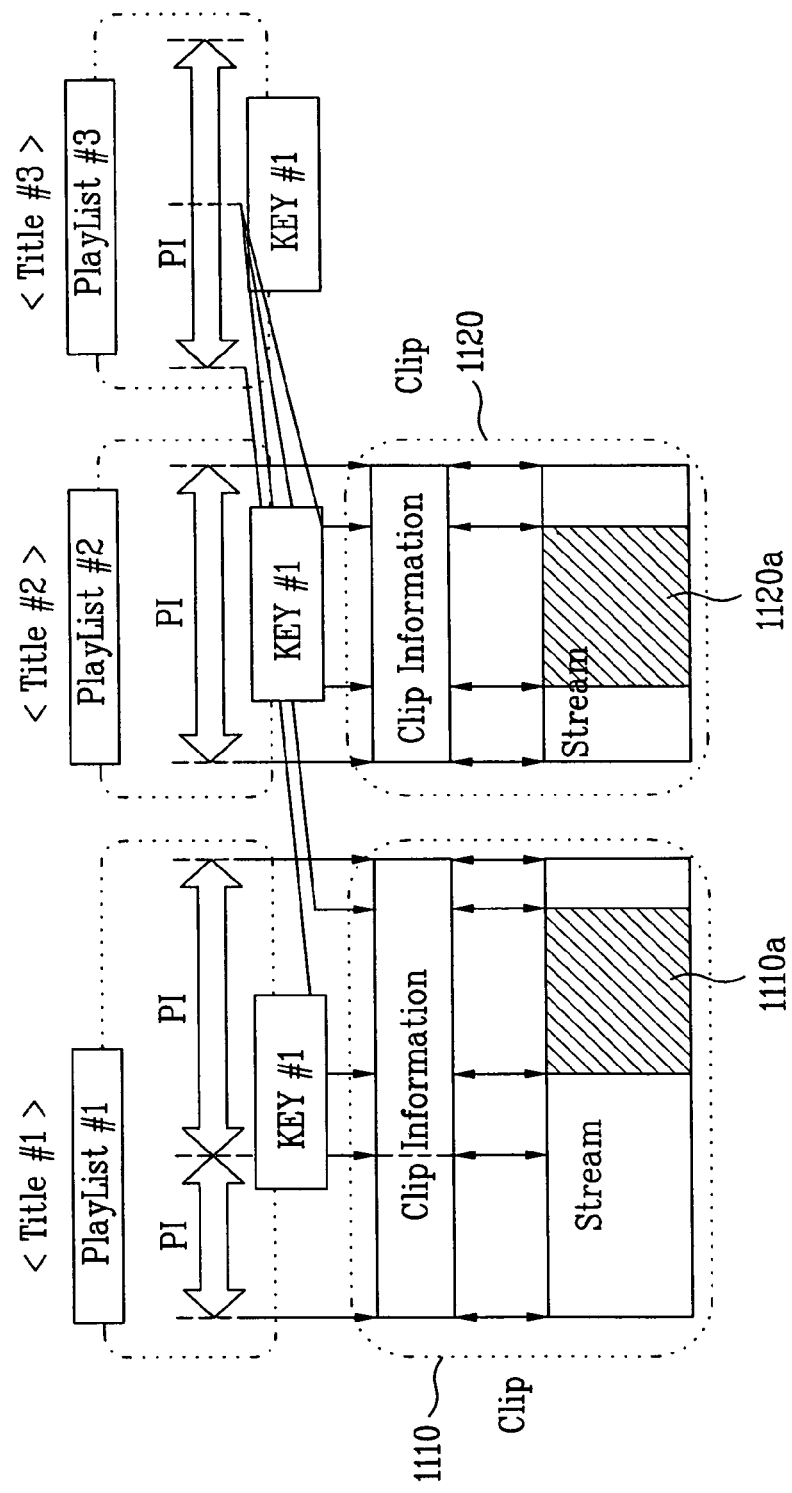
FIG. 11 is a diagram for explaining a case that a reproduced data is shared in the present invention.

FIG. 11 is a diagram for explaining a case that a reproduced data is shared in the present invention.

Referring to FIG. 11, a plurality of titles exist within a disc and one of the titles can share a clip configuring another title entirely or in part. In case that a plurality of titles share a clip with each other, a disc author preferably configures a title using data which are encrypted with a same "Unit Key" to be included in a same "CPS Unit". Namely, it is preferable that a data belonging to a different "CPS Unit" is not shared with each other. Since titles configured with data included in different "CPS Units", respectively cannot be decrypted with one "Unit Key" and should use different "Unit Keys", respectively, error may be brought about in reproducing the corresponding title. And, a player needs larger data processing capacity and higher data processing speed.

Title #3 is reproduced by PlayList #3 that includes a pair of PlayItems. The Title #3 is configured by sharing a portion 1110a of a clip 1110 reproduced by Title #1 and a portion 1120a of a clip 1120 reproduced by Title #2. In order for Title #3 to share a clip with Title #1, "Unit Key" equal to that of Title #1 should be assigned to the Title #3. Hence, Title #1 does not directly share a clip with Title #2 but needs to be encrypted with a same "Unit Key". Title #1, Title #2 and Title #3, which are associated with one another by sharing a clip directly or indirectly, possess the same "Unit Key" of "Key #1".

In the above explanation, Title # 3 is recorded within the disc for example. Yet, the same logic is applicable to a case that Title #3 is downloaded from outside of the disc. In providing a downloaded title, a content provider preferably uses a clip included in a same "CPS Unit" in configuring the title including the clip recorded within a disc. In case of attempting to use clips within a disc for a downloaded title, the clips are encrypted with a same "Unit Key".

In the above explanation, data are recorded in the recording medium and BD-ROM for reproducing the recorded data only is taken as an example. Yet, according to a recording medium, data can be written on the recording medium as well as can be read from the recording medium. A method of recording data encrypted with a key is explained with reference to BD-RE (BD-rewritable) among writable record media as follows.

First of all, in the process of writing data on a disc of BD-RE, PlayList that can reproduce the data to be written is virtually configured. The virtually configured PlayList is named Virtual PlayList. And, editing, record and the like of data to be written on a disc are performed by the Virtual PlayList.

The Virtual PlayList is configured with at least one PlayItem (PI). And, the PlayItem designates a clip to be reproduced by the Virtual PlayList. The clip exists within a recording medium or local storage and is real data reproducible by a real PlayList. The Virtual PlayList can be configured with data that can be reproduced by one real PlayList or can be configured by combining data reproduced by a plurality of real PlayLists entirely or in part.

In the following description, PlayList #1 shown in FIG. 11 is named real PlayList #1, PlayList #2 is named real PlayList #2, and PlayList #3 is named Virtual PlayList #3 that can write data reproduced by the PlayLists #1 and #2.

In configuring Virtual PlayList, the present invention is characterized in that a clip is included in a same "CPS Unit" if the clip used for a configuration of the Virtual PlayList is encrypted. Namely, it is preferable that the Virtual PlayList is not configured with data included in a different "CPS Unit".

Virtual PlayList #3 can be configured by combining a portion 110a of a clip 1110 reproduced by real PlayList #1 and a portion 1120a of a clip 1120 reproduced by real PlayList #2 together. The clip 1110 reproduced by real PlayList #1 and the clip 1120 reproduced by real PlayList #2 have the same "Unit Key" of "Key #1". In case of being encrypted with the same "Unit Key", clips are included in the same "CPS Unit". So, the clips 1110 and 1120 are the clips included in the same "CPS Unit" and Virtual PlayList #3 can be configured by combining portions 1110a and 1120a of the clips together. In case that data is recorded on a disc by the Virtual PlayList #3, the data recorded on the disc can be decrypted using "Key #1" or a key corresponding to "Key #1".

In case that the clip 1110 reproduced by real PlayList #1 and the clip 1120 reproduced by real PlayList #2 are included in different "CPS Units", respectively, i.e., if the clips 1110 and 1120 are encrypted with different "Unit Keys", respectively, the present invention does not configure Virtual PlayList. Through this, copy, editing and record of contents are not approved by a content provider can be prevented. Hence, the contents can be protected.

Figure 12:
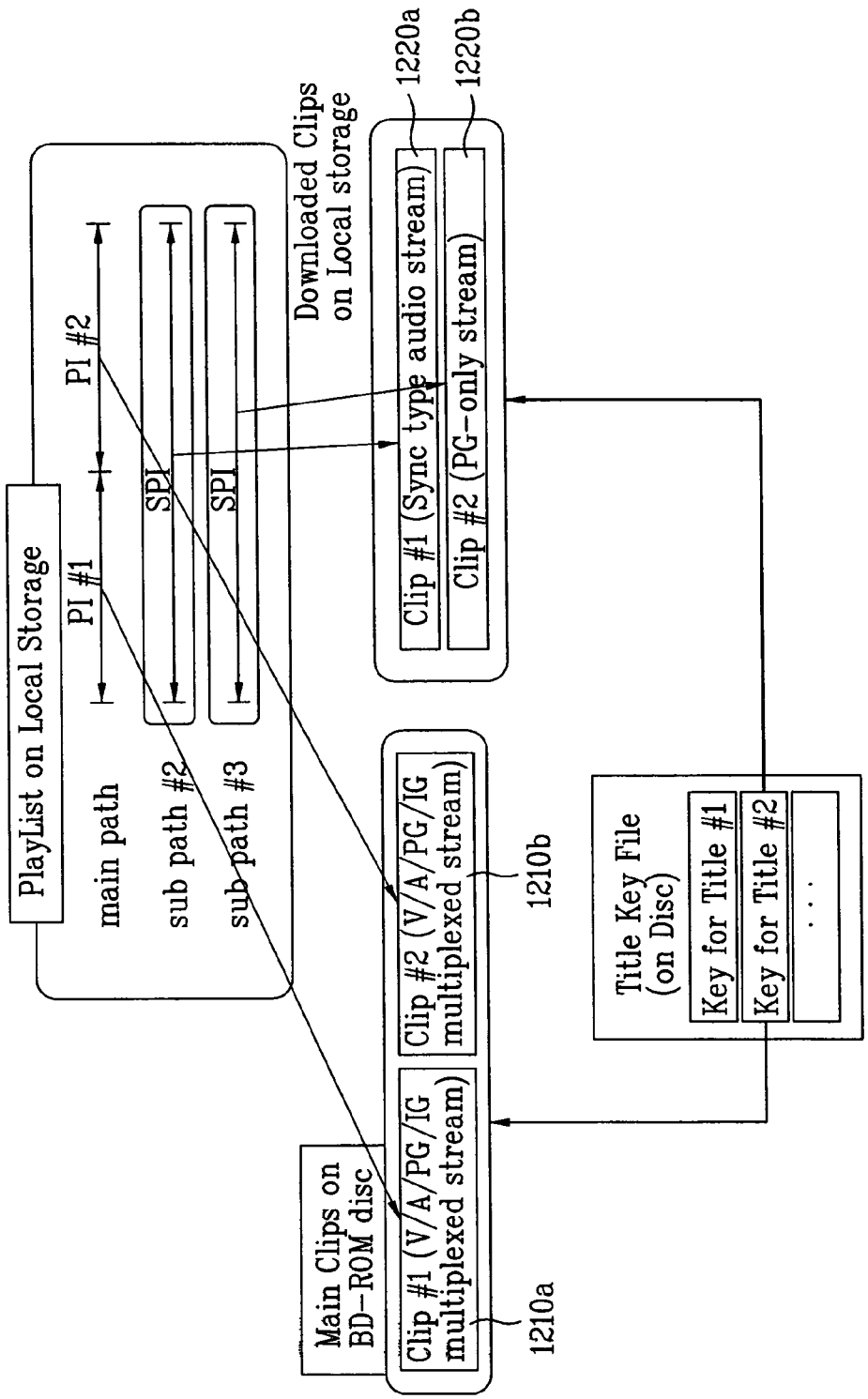
FIG. 12 is a diagram for explaining a case that a title is configured with a main path and a sub path in the present invention.

FIG. 12 is a diagram for explaining a case that a title is configured with a main path and a sub path in the present invention.

First of all, PlayList can include a main path only but can include one main path and at least one or more sub paths as well. In case that PlayList includes a sub path, data configuring the main path and the sub path are preferably included in the same "CPS Unit". In this case, the main path and the sub path can be decrypted with the same "Unit Key".

Referring to FIG. 12, a data configuring a main path is the data recorded within a disc and a data configuring a sub path is downloaded. PlayList, which can reproduce the downloaded data, includes one main path and two sub paths (sub path #2, sub path #3).

The main path includes PlayItem #1 (PI #1) and PlayItem #2 (PI #2). The PlayItem #1 designates clip #1 1210a recorded within a disc and the PlayItem #2 designates clip #2 1210b recorded within the disc. Each of the clip #1 and clip #2 is a clip generated from multiplexing video (V), audio (A), presentation graphic (PG) and interactive graphic (IG) together.

Each of the sub path #2 and the sub path #3 includes one SubPlayItem (SPI). SubPlayItem configuring the sub path #2 designates clip #1 1220a stored within a local storage, and SubPlayItem configuring the sub path #3 designates clip #2 1220b stored within the local storage. The clip #1 1220a and the clip #2 1220b stored within the local storage are clips downloaded from outside the disc. The clip #1 1220a is a sync type audio stream and the clip #2 is a stream for presentation graphic only (PG-only stream).

The clip #1 1210a and the clip #2 1210b recorded within the disc to configure the main path are clips decrypted with "Key for Title #2". In case of reproducing the main path and the sub path #2 and/or sub path #3, the clip #1 1220a and the clip #2 1220n stored in the local storage to configure the sub path #2 and the sub path #3, respectively can be decrypted with "Key for Title #2".

In case of encrypting the clip #1 1220a and the clip #2 1220b configuring the sub path #2 and the sub path #4, respectively, a content provider should perform the encryption with the same key of the clip #1 1210a and the clip #2 1210b configuring the main path to be reproduced together with the sub path. A user possessing "Key for Title #2" among users receiving the downloaded encrypted clip can simultaneously reproduce the main path and the sub path.

FIG. 12 shows an example that data configuring a sub path is downloaded. Yet, all data reproduced by PlayList can be data recorded within a disc or data configuring a main path can be downloaded as well. Moreover, a portion of data configuring main or sub path is downloaded and is then reproduced together with data recorded within a disc as well.

Figure 4:
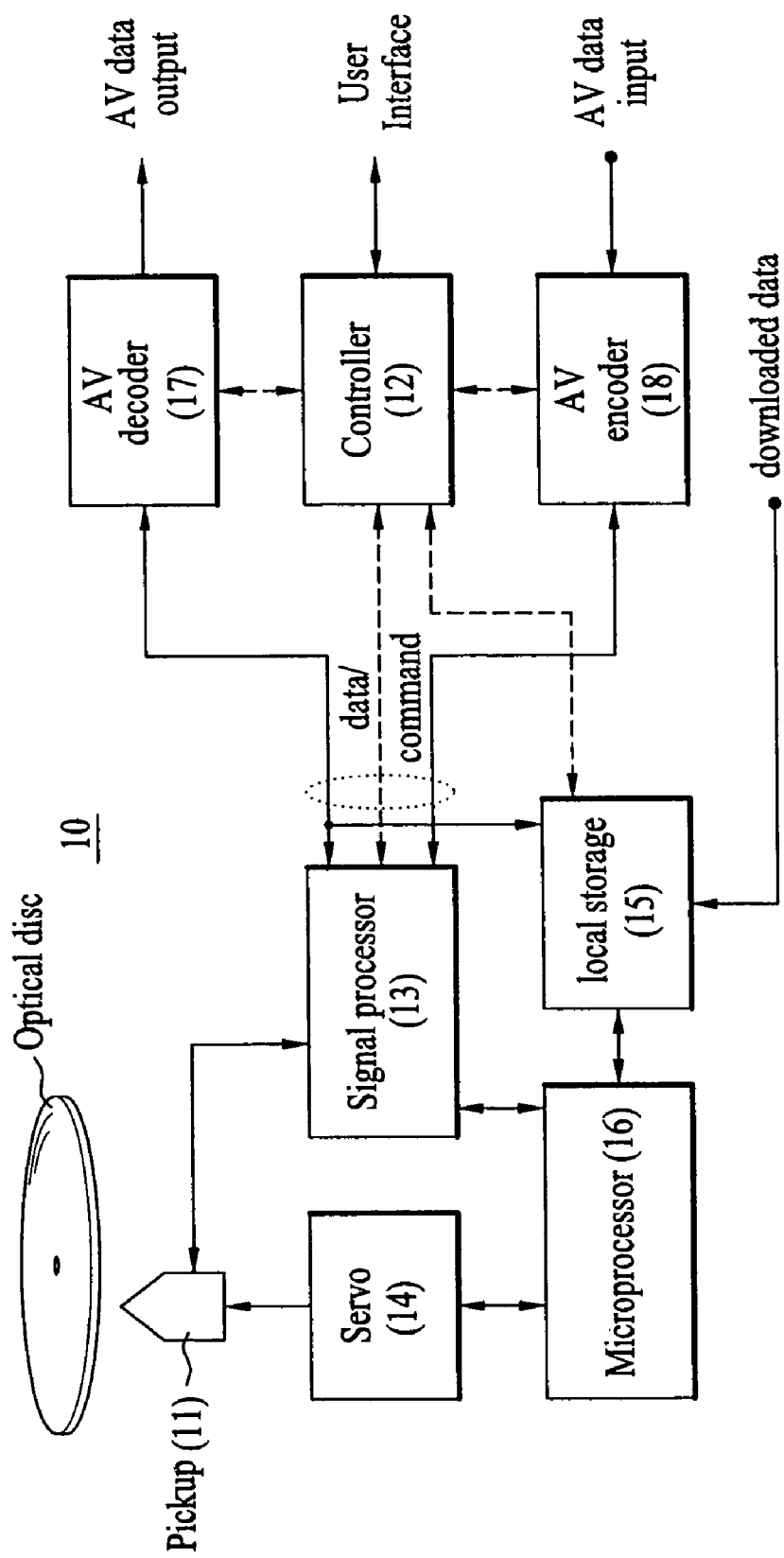
FIG. 4 is a block diagram of an optical recording/reproducing device according to the present invention.

An apparatus for decrypting data according to the present invention is explained with reference to FIG. 4 as follows.

An apparatus for decrypting data according to the present invention includes a pickup 11 reading data recorded in recording medium, a local storage 15 storing encrypted and downloaded data associated with the recording medium, and a controller 12 decrypting the downloaded data using a key within a key file stored in one of the recording medium or the local storage.

A decryption key of the downloaded data could be a decryption key of data recorded within the recording medium or a key separately stored in the recording medium for a decryption of the downloaded data.

In case of decrypting the data using the key stored in the local storage, keys stored in the local storage 15 may be read from the recording medium to be stored in the local storage. A key downloaded from outside of the recording medium can be included via a separate process.

In case of decrypting the data recorded within the recording medium, the controller 12 can read out the key from the key file stored in the recording medium. In some cases, the key file stored in the local storage can be used for both of the data stored in the local storage and the data recorded within the recording medium.

In case of storing keys in the local storage 15, a secure area is established in the local storage to prevent such a risk as a hacking and the like. And, the keys can be placed in the secure area.

In case that the data downloaded to the local storage 15 is sub path data associated with a main path recorded within the recording medium, it is preferable that the sub path data is decrypted using a same key of the main path data. For this, a content provider should encrypt sub path data provided to a user using a same key of main path data recorded within the recording medium.

And, a data decrypting apparatus according to the present invention includes a pickup 11 reading information of a recording medium from the recording medium, a local storage 15 storing encrypted and downloaded data associated with the recording medium, and a controller 12 reading out a decryption key using link information between the downloaded data and the decryption key and decrypting the downloaded data using the decryption key. And, a content provider can place the link information in a database file of the downloaded data so as to provide the link information to a user.

Moreover, the link information can be configured as a separate file to be stored in the local storage. Information indicating a CPS unit to which each data belongs can be used as the link information. Moreover, CPS_unit_number can be used as information indicating the CPS unit.

Accordingly, by the present invention, unauthorized copy, redistribution and the like of contents can be prevented. Hence contents can be safely provided and data can be efficiently reproduced, whereby more convenient functions can be provided to a user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of reproducing data, comprising the steps of downloading encrypted data associated with a recording medium and a key file including a first decryption key and a second decryption key, to a local storage, the first decryption key used for decrypting a data recorded on the recording medium, the second decryption key used for decrypting the downloaded data;

constructing a virtual playlist by binding a playlist for the data recorded on the recording medium with a playlist for the downloaded data, the virtual playlist including reproducing information of the data recorded on the recording medium and the downloaded data;

reading the first decryption key and the second decryption key by using a link information, the link information including identification information of the data recorded on the recording medium and the downloaded data and stored in the key file;

decrypting the data recorded on the recording medium by using the first decryption key, and the downloaded data by using the second decryption key; and reproducing the data recorded on the recording medium and the downloaded data by using the constructed virtual playlist.

2. The method of claim 1, wherein the first decryption key is used to further decrypt the downloaded data.

3. The method of claim 1, wherein the first and second decryption keys are used to decrypt a content unit divided from the data recorded on the recording medium and the downloaded data, and the content units having same identification information are decrypted by using same decryption key.

4. The method of claim 1, wherein the key file is stored on a secure area in the local storage.

5. The method of claim 1, wherein in case that the downloaded data is sub path data associated with a main path recorded within the recording medium, the sub path data is decrypted using same decryption key of the main path data.

6. The method of claim 3, wherein the link information is a content protection system unit number, the content protection system unit number indicating identification number of the content unit.

7. The method of claim 6, wherein the first and second decryption keys are defined with reference to the content protection system unit number.

8. An apparatus for reproducing data, comprising:
a local storage configured to store data associated with a recording medium; and
a controller configured to
download encrypted data associated with the recording medium and a key file including a first decryption key and a second decryption key, to the local storage, the first decryption key used for decrypting a data recorded on the recording medium, the second decryption key used for decrypting the downloaded data,
construct a virtual playlist by binding a playlist for the data recorded on the recording medium with a playlist for the downloaded data, the virtual playlist including reproducing information of the data recorded on the recording medium and the downloaded data,
read the first decryption key and the second decryption key by using a link information, the link information including identification information of the data recorded on the recording medium and the downloaded data and stored in the key file,
decrypt the data recorded on the recording medium by using the first decryption key, and the downloaded data by using the second decryption key, and
reproduce the data recorded on the recording medium and the downloaded data by using the constructed virtual playlist.

9. The apparatus of claim 8, wherein the first decryption key is used to further decrypt the downloaded data.

10. The apparatus of claim 8, wherein the first and second decryption keys are used to decrypt a content unit divided from the data recorded on the recording medium and the downloaded data, and the content units having same identification information are decrypted by using same decryption key.

11. The apparatus of claim 8, wherein the key file is stored on a secure area in the local storage.

12. The apparatus of claim 8, wherein in case that the downloaded data is sub path data associated with a main path recorded within the recording medium, the controller is configured to decrypt the sub path data using same decryption key of the main path data.

13. A non-transitory computer-readable medium storing a data structure used in decrypting data, comprising:
a stream area storing stream data;
a database area storing management data managing reproduction of the stream data and a downloaded data associated with the recording medium, the downloaded data stored in a local storage of a reproducing apparatus,
wherein the management data including a virtual playlist, the virtual playlist including reproducing information of the data recorded on the recording medium and the downloaded data, the virtual playlist constructed by binding a playlist for the stream data with a playlist for the downloaded data; and
a secure area storing a key file including a first decryption key and a second decryption key, the first decryption key used to decrypt the stream data, the second decryption key used to decrypt the downloaded data,
wherein the key file includes a link information including identification information of the stream data and the downloaded data.

14. The non-transitory computer-readable medium of claim 13, wherein the first decryption key is used to further decrypt the downloaded data.

15. The non-transitory computer-readable medium of claim 13, wherein the first and second decryption keys are used to decrypt a content unit divided from the data recorded on the recording medium or the downloaded data, and the content units having same identification information are decrypted by using same decryption key.

16. The non-transitory computer-readable medium of claim 13, wherein the key file is stored on a secure area in the local storage.

17. The non-transitory computer-readable medium of claim 13, wherein in case that a plurality of titles stored in the recording medium share a clip entirely or in part each other, the titles sharing the clip are decrypted by using same decryption key.

18. The non-transitory computer-readable medium of claim 13, wherein in case that a title includes a main path and a sub path, the main and sub paths of the title are decrypted by using same decryption key.

19. A method of recording a data structure used in decrypting data on a recording medium, comprising:

constructing a virtual playlist by binding a playlist for a data recorded on the recording medium with a playlist for a downloaded data associated with the recording medium, the virtual playlist including reproducing information of the data recorded on the recording medium and the downloaded data, the downloaded data stored in a local storage of a recording apparatus;

recording the constructed virtual playlist on the recording medium; and recording a key file including a first decryption key and a second decryption key on the recording medium, the first decryption key used to decrypt the data recorded on the recording medium, the second decryption key used to decrypt the downloaded data, and wherein the key file includes a link information including identification information of the data recorded on the recording medium and the downloaded data.

20. The method of claim 19, wherein the first decryption key is used to further decrypt the downloaded data.

21. The method of claim 19, wherein the first and second decryption keys are used to decrypt a content unit divided from the data recorded on the recording medium and the downloaded data, and the content units having same identification information are decrypted by using same decryption key.

22. The method of claim 19, wherein the key file is stored by the recording device on a secure area in the local storage.

23. An apparatus for recording a data structure used in decrypting data on a recording medium, comprising:

a local storage configured to store a downloaded data associated with the recording medium;

a pickup configured to record data on the recording medium; and a controller configured to construct a virtual playlist by binding a playlist for a data recorded on the recording medium with a playlist for the downloaded data, the virtual playlist including reproducing information of the data recorded on the recording medium and the downloaded data, control the pickup to record the constructed virtual playlist on the recording medium, control the pickup to record a key file including a first decryption key and a second decryption key on the recording medium, the first decryption key used to decrypt the data recorded on the recording medium, the second decryption key used to decrypt the downloaded data, and wherein the key file includes a link information including identification information of the data recorded on the recording medium and the downloaded data.

24. The apparatus of claim 23, wherein the first decryption key is used to further decrypt the downloaded data.

25. The apparatus of claim 23, wherein first and second decryption keys are used to decrypt a content unit divided from the data recorded on the recording medium and the downloaded data, and the content units having same identification information are decrypted by using same decryption key.

26. The apparatus of claim 23, wherein the key file is stored within a secure area in the local storage.

27. The method of claim 22, the first decryption key stored in the local storage is read from the first decryption key recorded on the recording medium.

28. The apparatus of claim 26, wherein the first decryption key stored in the local storage is read from the first decryption key recorded on the recording medium.

* * * * *